(12) United States Patent
Deschaine et al.

(10) Patent No.: US 6,512,755 B1
(45) Date of Patent: Jan. 28, 2003

(54) WIRELESS TELECOMMUNICATIONS ACCESS SYSTEM

(75) Inventors: Stephen A. Deschaine, Sunnyvale; Mark A. McDonald, Plano, both of TX (US); Richard J. Briggs, Jr., Pleasanton, CA (US); Marcus C. Mertsching, Walnut Creek, CA (US); Michael B. Flohr, San Jose, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/221,523

(22) Filed: Dec. 28, 1998

Related U.S. Application Data

(60) Provisional application No. 60/068,902, filed on Dec. 29, 1997.

(51) Int. Cl.$^7$ ................................................ H04L 12/66
(52) U.S. Cl. ..................... 370/338; 370/352; 455/507; 455/517; 455/524
(58) Field of Search ................................. 370/338, 352, 370/389, 328, 329; 455/507, 517, 524; 359/115, 118

(56) References Cited

U.S. PATENT DOCUMENTS

| | | | |
|---|---|---|---|
| 5,280,472 A | 1/1994 | Gilhousen et al. ............. 370/18 |
| 5,351,270 A | 9/1994 | Graham et al. ................. 375/1 |
| 5,375,140 A | 12/1994 | Bustamante et al. ........... 375/1 |
| 5,398,034 A | 3/1995 | Spilker et al. ............... 342/357 |
| 5,477,195 A | 12/1995 | Silker ........................... 331/11 |
| 5,533,023 A | 7/1996 | Ohlson et al. ............. 370/69.1 |
| 5,548,583 A | 8/1996 | Bustamante ................... 370/18 |
| 5,566,164 A | 10/1996 | Ohlson .......................... 370/18 |
| 5,570,349 A | 10/1996 | Bustamante et al. ........... 370/18 |
| 5,574,721 A | 11/1996 | Magill ........................... 370/18 |
| 5,623,487 A | 4/1997 | Natali ........................... 370/342 |
| 5,654,955 A | 8/1997 | Natali ........................... 370/320 |
| 5,668,795 A | 9/1997 | Magill et al. ................ 370/209 |
| 5,687,166 A | 11/1997 | Natali et al. ................. 370/209 |
| 5,696,762 A | 12/1997 | Natali et al. ................. 370/320 |
| 5,717,713 A | 2/1998 | Natali ........................... 375/200 |
| 5,729,570 A | 3/1998 | Magill ........................... 375/206 |
| 5,734,639 A | 3/1998 | Bustamante et al. ......... 370/208 |
| 5,764,630 A | 6/1998 | Natali et al. ................. 370/320 |
| 5,974,331 A | * 10/1999 | Cook et al. .................. 455/461 |
| 5,978,672 A | * 11/1999 | Hartmaier et al. ........... 455/413 |
| 6,009,159 A | * 12/1999 | Baiyor et al. ................ 379/211 |
| 6,014,560 A | * 1/2000 | Kramer ......................... 455/414 |
| 6,141,356 A | * 10/2000 | Gorman ........................ 370/493 |
| H1941 H | * 2/2001 | Hoffpauir et al. ............ 370/265 |

* cited by examiner

*Primary Examiner*—Alpus H. Hsu
*Assistant Examiner*—Roberta Stevens
(74) *Attorney, Agent, or Firm*—Baker & McKenzie; V. Lawrence Sewell; Craig A. Hoersten

(57) ABSTRACT

A system for providing wireless telecommunications access is presented. The system includes a wireline assembly that provides access to a telecommunications system for one or more wireline subscribers. The system also includes a wireless assembly that provides access to a telecommunications system for one or more wireless subscribers. A common control and switching system is connected to the wireline assembly, the wireless assembly, and a switched network. The common control and switching assembly establishes telecommunications channels between the wireline assembly, the wireless assembly, and the switched network, and controls the telecommunications channels.

15 Claims, 14 Drawing Sheets

WIRELESS TELECOMMUNICATIONS ACCESS SYSTEM

CLAIM OF PRIORITY

The present applications claims priority from U.S. provisional patent application No. 60/068,902, "System and Method for Wireless Telecommunications," Stephen Deschaine, inventor, filed Dec. 29, 1997.

RELATED PATENT APPLICATIONS

The present application is related to U.S. Patent Application Ser. No. 09/221,610 "Method and System for Data Communications," naming Stephen A. Deschaine, Mark A. McDonald, D. Thomas Magill, Richard J. Briggs, Marcus C. Mertsching, and D. Darryl Denton as inventors, Alcatel filed contemporaneously with the present application.

FIELD OF THE INVENTION

The present invention relates to a wireless telecommunications access system, and more particularly, a wireless telecommunications access system that provides for optimized use of the radio frequency spectrum.

BACKGROUND

Wireless telecommunications access systems are used to provide wireless telecommunications services to mobile and fixed users or subscribers. Such wireless systems are typically allotted a predetermined amount of radio frequency spectrum, such that the maximum number of subscribers that may be serviced by the wireless access system is determined by the amount of frequency spectrum required per subscriber.

Although wireless telecommunications access systems are known, several problems exist with current implementations of wireless telecommunications access systems. One problem is that installation and maintenance of a wireless telecommunications access system requires a significant amount of space and support facilities. Thus, the construction and maintenance of a wireless telecommunications access system can require a substantial investment.

Another problem with existing wireless telecommunications access systems is that they are not compatible with other non-wireless facilities, such as conventional landline systems. Thus, economies of scale cannot be realized by installing wireless telecommunications access systems with conventional landline systems.

Yet another technical problem with wireless telecommunications access systems is that such wireless access systems do not effectively manage frequency spectrum allocated to the system. Thus, less subscribers may be serviced by the system than could otherwise be serviced in an optimized system.

SUMMARY OF THE INVENTION

Therefore, a need has arisen for a wireless telecommunications access system that reduces the costs of installation and maintenance of such wireless telecommunications access systems. In addition, a wireless telecommunications access system is required that optimizes use of the radio frequency spectrum.

In accordance with the present invention, a wireless telecommunications access system is provided that substantially eliminates or reduces the disadvantages and problems associated with previously developed wireless telecommunications access systems.

One aspect of the present invention is a system for providing wireless telecommunications access. The system includes a wireline assembly that provides access to a telecommunications system for one or more wireline subscribers. The system also includes a wireless assembly that provides access to a telecommunications system for one or more wireless subscribers. A common control and switching system is connected to the wireline assembly, the wireless assembly, and a switched network. The common control and switching assembly establishes telecommunications channels between the wireline assembly, the wireless assembly, and the switched network, and controls the telecommunications channels.

Another aspect of the present invention is a method for accessing a telecommunications system from a single, coordinated access unit. The method includes transferring channels of telecommunications data between a switched network and wireline service users. Channels of telecommunications data are also transferred between the switched network and wireless service users. One or more channels of telecommunications data are also transferred between the wireless service user(s) and the wireline service user(s).

Yet another aspect of the present invention is a method for providing access to a telecommunications system from a single access unit. The method includes receiving channels of telecommunications data from a switched network. A connection is established to a user in response to signaling and control data associated with each channel of telecommunications data. The user may be either a wireless services subscriber or a wireline services subscriber. Other channels of telecommunications data are received, where each other channel of telecommunications data is received from either a wireline services subscriber or a wireless services subscriber. A connection to another user or the switched network is established in response to signaling and control data associated with each other channel of telecommunications data. The other user may be either a wireline services subscriber or a wireless services subscriber.

The present invention provides many important technical advantages. One important technical advantage of the present invention is a wireless telecommunications access system that may be installed with lower installation costs, space requirements, and support system requirements than existing wireless telecommunications access systems. The wireless telecommunications access system of the present invention includes an optimized system architecture and component design that allow the wireless telecommunications access system to be installed in a smaller space and manufactured less expensively.

Another important technical advantage of the present invention is a wireless telecommunications access system that is compatible for use with existing landline telecommunications access systems. The wireless telecommunications access system of the present invention thus may be installed in conjunction with existing landline telecommunications access facilities which further reduces costs for installation and maintenance of the system.

BRIEF DESCRIPTION OF THE DRAWINGS

The present invention may be better understood from the following detailed description of an exemplary embodiment of the present invention with reference to the accompanying drawings, in which.

DETAILED DESCRIPTION OF AN EMBODIMENT OF THE PRESENT INVENTION

Figure 1:
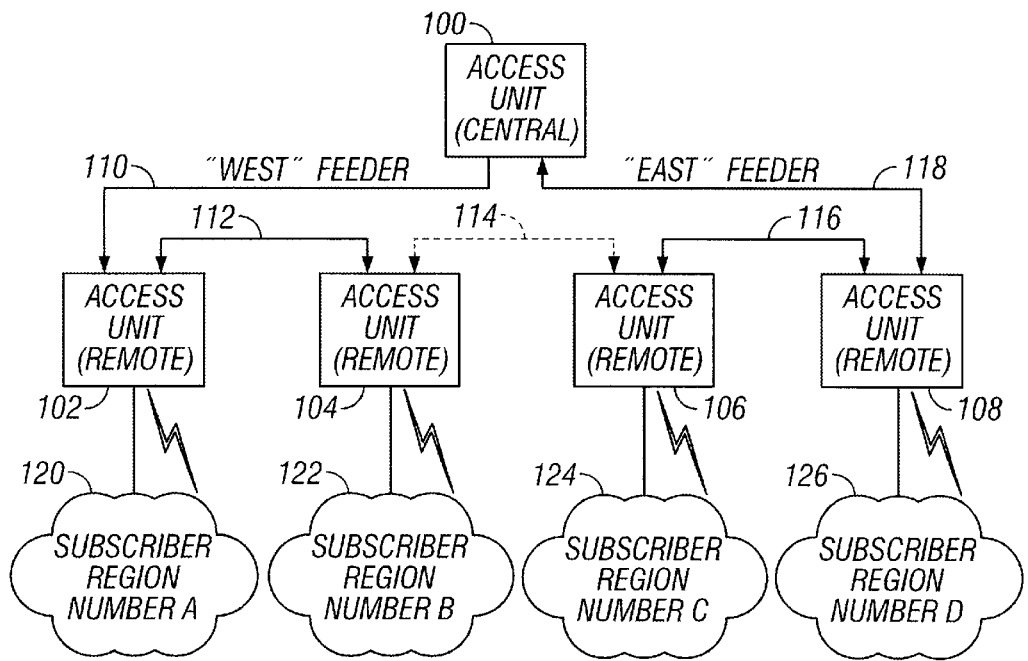
FIG. 1 is a block diagram of a distributed telecommunications access system in accordance with one embodiment of the present invention.

FIG. 1 is a block diagram of a distributed telecommunications access system in accordance with an embodiment of the present invention. The distributed telecommunications access system of FIG. 1 includes a central access unit 100 which is connected to remote access units 102, 104, 106, and 108. Central access unit 100 may also be coupled to a switched network, such as the public switched telecommunications network.

In the embodiment shown in FIG. 1, central access unit 100 is connected to remote access unit 102 by a west fiber optic feeder 110. West fiber optic feeder 110 may be part of a fiber optic ring for telecommunications, such as a Synchronous Optical Network ("SONET") ring. Remote access unit 102 is also coupled to remote access unit 104 via fiber optic conductor 112, remote access units 104 and 106 are connected by a fiber optic conductor 114, and remote access units 106 and 108 are connected by fiber optic connector 116. East fiber optic feeder 118 connects access unit 108 to central access unit 100. The access units 100, 102, 104, 106, and 108 may also or alternatively be connected by other suitable connectors, including but not limited to physical connectors, logical connectors, or a combination of physical and logical connectors.

Remote access units 102, 104, 106, and 108 are each used to provide telecommunications access services to telecommunications access subscriber regions 120, 122, 124, and 126, respectively. Telecommunications access subscriber regions 120, 122, 124, and 126 may be geographically distinct areas, or may be geographically identical areas that are used to provide different services to subscribers. For example, remote access unit 102 may be used to provide integrated services digital network service to users of a predetermined geographical area, whereas remote access unit 104 may be used to provide wireless voice telecommunications services.

Each remote access unit may also or alternatively provide one or more services to subscribers. For example, remote access unit 102 may include a wireline assembly that is used to provide services via landline communications, and a wireless assembly that is used to provide services via a wireless telecommunications access system. The wireline and wireless assemblies may also or alternatively provide one or more service formats, including but not limited to analog wireline and wireless telecommunications service, digital wireline and wireless telecommunications service, wireline and wireless video service, wireline and wireless integrated services digital network service, and other suitable services.

In operation, a plurality of telecommunications channels are established using the distributed telecommunications access system of FIG. 1. Telecommunications channels may be originated from a switched network, such as the public switched telecommunications network, or from a wireline or wireless subscriber located in one of service areas 120, 122, 124, and 126. Signaling data is first transmitted by the distributed telecommunications access system between the call initiator and the call terminus. After the call has been setup, the distributed telecommunications access system is used to maintain the call until completion. After call completion, the distributed telecommunications access system breaks down the telecommunications channel using suitable control commands, and performs billing and other operational, administrative, maintenance, and provisioning functions.

The number of remote access units and subscriber regions shown is exemplary, and may be greater or lesser than the number shown. Central access unit 100 may be used to provide services to an associated subscriber region, or may be used to provide access to a central office switch or a switched network, as shown.

Figure 2:
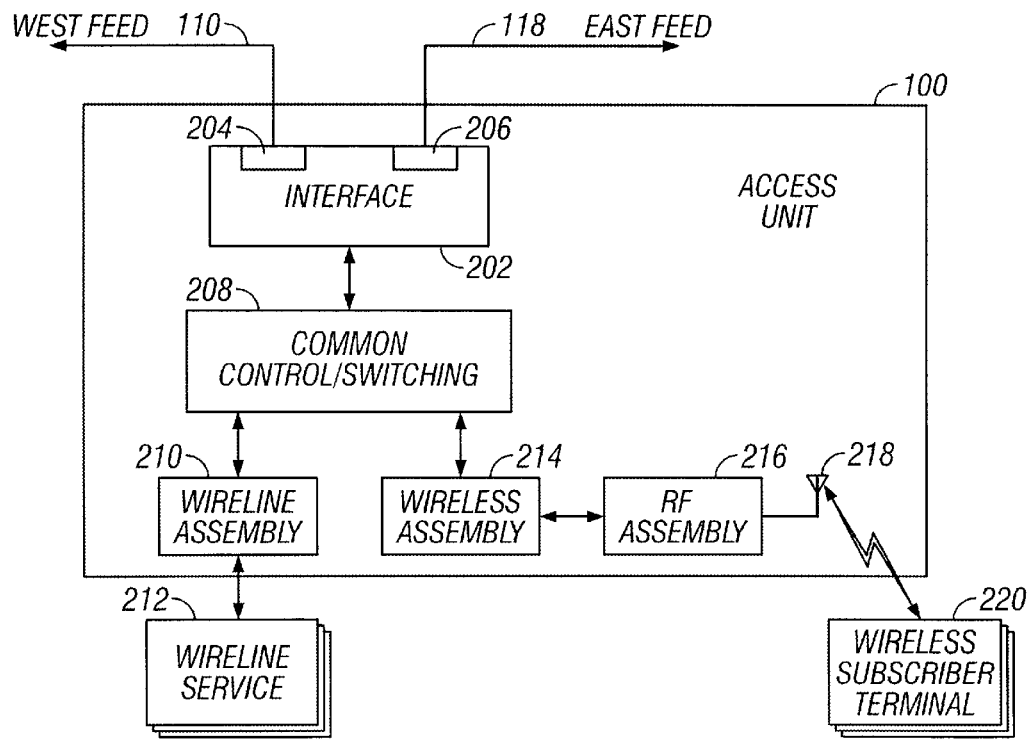
FIG. 2 is a block diagram of a remote access unit in accordance with one embodiment of the present invention.

FIG. 2 is a block diagram of an access unit 100 in accordance with an embodiment of the present invention. Access unit 100 may be used as a central access unit 100, a remote access unit 102, 104, 106, or 108, or in other suitable applications.

Access unit 100 includes an interface unit 202 which is coupled to a telecommunications trunk carrying a plurality of telecommunications data channels such as west fiber optic feeder 110 and east fiber optic feeder 118 via feeder interface cards 204 and 206. In this regard, telecommunications data includes analog or digitally encoded data for voice, facsimile, data, video, or other suitable applications. Interface unit 202 may be used to convert the signal format of data received from fiber optic feeders 110 and 118 into a signal format that is used by access unit 100, such as from an optical signal format to an electrical signal format. Feeder interface cards 204 and 206 may be optical to electrical converters, or other suitable interface cards.

Interface 202 is coupled to common control/switching system 208 via electrical, optical, logical, or other suitable connections. Common control/switching system 208 is also coupled to wireline assembly 210 and wireless assembly 214 via electrical, optical, logical, or other suitable connections. For example, common control/switching system 208 may be coupled to wireless assembly 214 by a subscriber bus that is configured to carry channels of telecommunications data to support services provided to subscribers. Common control/switching system 208 is used to control the transfer of telecommunications data between interface 202, wireline assembly 210, and wireless assembly 214. Common control/switching system 208 may also or alternatively contain switching functionality such that a telecommunications channel received via interface 202, wireline assembly 210, or wireless assembly 214 may be switched to another telecommunications channel that is accessed through interface 202, wireline assembly 210, or wireless assembly 214.

Wireline assembly 210 is a landline telecommunications access system. For example, wireline assembly 210 may be configured to interface with fiber optic or electrical conductors that are installed to subscribers at fixed locations, and to provide telecommunications services for those subscribers, such as access to the public switched telecommunications network, data services, video services, and other suitable telecommunications services. Wireline assembly is coupled to wireline service assemblies 212, which are used to provide predetermined wireline systems services. For example, landline integrated services digital network service, landline T1 service, and landline video service may each be provided by one or more wireline assemblies 212.

Wireless assembly 214 is a wireless telecommunications access system that is used to provide telecommunications services to subscribers via radio frequency electromagnetic radiation. Wireless assembly 214 performs data format functions, timing functions, signal modulation functions, and other suitable functions. Wireless assembly 214 is coupled to radio frequency assembly 216, which performs the radio frequency signal amplification and signal modulation functions for the wireless telecommunications access system. Radio frequency assembly 216 transmits radio frequency electromagnetic radiation carrying encoded data signals via antenna 218 to one or more wireless subscriber terminals 220. Radio frequency assembly 216 also receives radio frequency electromagnetic radiation carrying encoded data signals from the wireless subscriber terminals 220.

In operation, access unit 100 of the wireless telecommunications access system is used to provide telecommunications services to wireless subscribers and landline subscribers. Telecommunications channels are established by access unit 100, typically in combination with other systems accessed via a switched network, such as the public switched telecommunications network. Telecommunications channels may also or alternatively be established by access unit 100. For example, telecommunications signaling data may be received over west fiber optic feeder 110 or east fiber optic feeder 118. This telecommunications signaling data is then transmitted through interface 202 to common control/switching system 208. Common control switching/system 208 determines the proper destination for the telecommunications channel from the signaling data and establishes the telecommunications channel with the subscriber.

Alternatively, common control/switching subsystem 208 may receive telecommunications signaling data via wireline assembly 210 and wireline service subsystems 212. Common control/switching system 208 processes the telecommunications signaling data to determine the proper destination, such as the public switched telecommunications network or another access unit via interface 202, a subscriber connected to wireline assembly 210, or a subscriber connected to wireless assembly 214. Common control/switching system 208 then establishes the telecommunications channel between the origination and destination locations, maintains the telecommunications channel during use, and breaks down the telecommunications channel after use has ended.

Access unit 100 thus provides a coordinated platform for provision of wireless and wireline services, and may be installed with lower installation costs, space requirements, and support system requirements than are typically required for systems providing wireline and wireless telecommunications access systems. Access unit 100 is compatible for use with existing landline telecommunications access systems, and may be coupled to existing telecommunications trunks, such as west fiber optic feeder 110 and east fiber optic feeder 118, and existing wireline subscribers, such as through wireline service assemblies 212.

Figure 3:
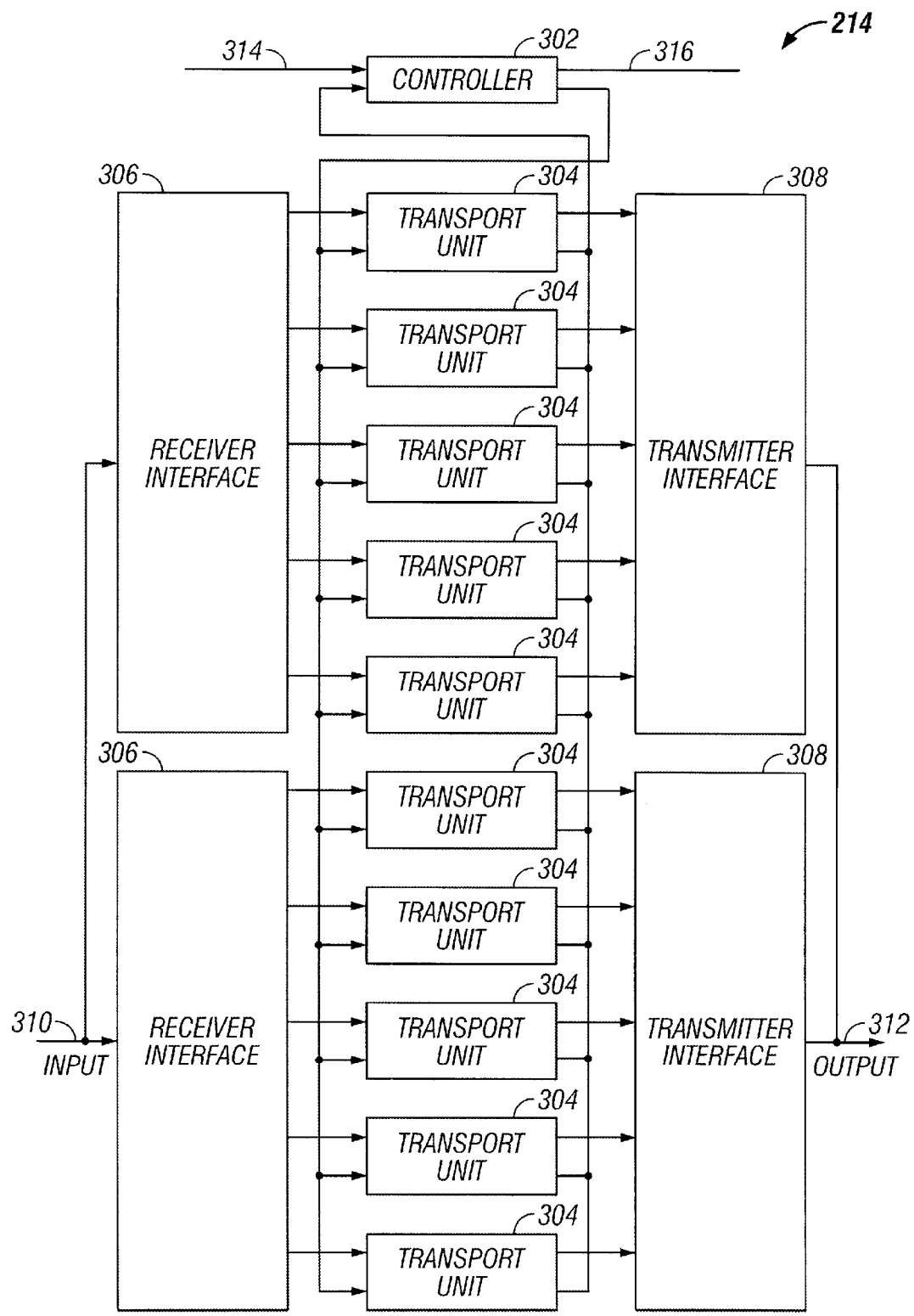
FIG. 3 is a block diagram of wireless assembly in accordance with one embodiment of the present invention.

FIG. 3 is a block diagram of wireless assembly 214 in accordance with an embodiment of the present invention. Wireless assembly 214 is used to provide wireless telecommunications services to subscribers, such as access to a switched network, voice switching services, video switching services, data switching services, and other suitable telecommunications services.

In the exemplary embodiment of wireless assembly 214 shown in FIG. 3, controller 302 is coupled to ten transport units 304 by a physical connection, a logical connection, or other suitable connections. Transport units 304 are also coupled to receiver interfaces 306 and transmitter interfaces 308 by a physical connection, a logical connection, or other suitable connections. Each receiver interface 306 is coupled to input 310 and receives a plurality of encoded telecommunications channels from a wireless receiver system coupled to input 310. The plurality of encoded telecommunications channels are processed by transport units 304, and are then transmitted to transmitter interfaces 308 for transmission over a wireless transmission system coupled to output 312.

Each receiver interface 306 receives an analog signal carrying encoded data from a radio frequency signal receiver, and converts the analog signal into five trunk groups of digital signals. One trunk group of digital signals is transmitted to each transport unit 304. The transport units 304 then convert the data and demodulate the data to allow the data to be transferred to a plurality of subscriber buses for processing. For example, the data transferred to the subscriber buses may include signaling data that is used to identify requests for telecommunications channels. Likewise, the data may include payload data for established telecommunications channels.

The transport units 304 also receive data for each trunk group from the subscriber buses that must be formatted and modulated for transmission via radio frequency assembly 216 of FIG. 2. The transport units 304 are operable to assemble the trunk group data into appropriate channels, such as signaling data and control data channels, to encode the data, such as by code division multiplexing, and to modulate the data onto a carrier signal, such as a multiple carrier modulation carrier signal. The formatted and modulated data is then transmitted to transmitter interfaces 308. An example of a suitable data format is provided by U.S. Patent Application Ser. No. 09/221,610 "Method and System for Data Communications," naming Stephen Deschaine, Mark MacDonald, et al. as inventors, Alcatel, filed contemporaneously with the present application, which is hereby incorporated by reference for all purposes.

Transmitter interfaces 308 receive the trunk groups of digital data from the transport units 304 and combine the trunks groups into a single signal. The signal is then converted from digital to analog, and is further processed for wireless transmission via radio frequency assembly 216 to subscriber terminals 220.

Controller 316 receives control data from common control/switching system 208 via control channel 314. This control data includes instructions for channel assignment and formatting of signaling and control data into predetermined channels through transport units 304. Controller 316 also transmits control data that has been derived from signals processed by transport units 304 to common control/switching system 208 via control channel 316.

In operation, encoded data signals are received on radiofrequency carriers by a suitable receiver, such as radio frequency assembly 216. The encoded data signal is transferred to receiver interface 306, which converts the encoded data signals from analog to digital and separates trunk groups of signals from the encoded data signals. The trunk groups of signals are then transmitted to transport units 304, which each demodulate channels of data from a trunk group of signals. The channels of data are then transferred to a subscriber bus interface for processing.

Further, channels of processed telecommunications data are received from the subscriber bus interface at the transport units 304, and are modulated into a suitable format, such as code division multiple access modulation with a multiple carrier modulation format. The transport units 34 then transmits the telecommunications data channels in trunk groups to the transmitter interfaces 308. The transmitter interfaces convert the trunk groups of telecommunications data channels from digital to analog, and combine the trunk groups to form a single signal of encoded data. This signal is then transferred to a suitable radio transmitter, such as radio frequency assembly 216, for transmission to subscribers.

Although wireless assembly 214 is shown including transport units 304, receiver interfaces 306, and transmitter interfaces 308, the combination of transport units 304 and receiver interfaces 306 or of transport units 304 and transmitter interfaces 308 may also be utilized. For example, in a system in which the processing of received telecommunications channels occurs separate from the processing of transmitted telecommunications channels, it may be optimal to duplicate the functionality of the transport units such that one set of transport units interface with the receiver interface and a second set of transport units interface with the transmitter interface.

Figure 4:
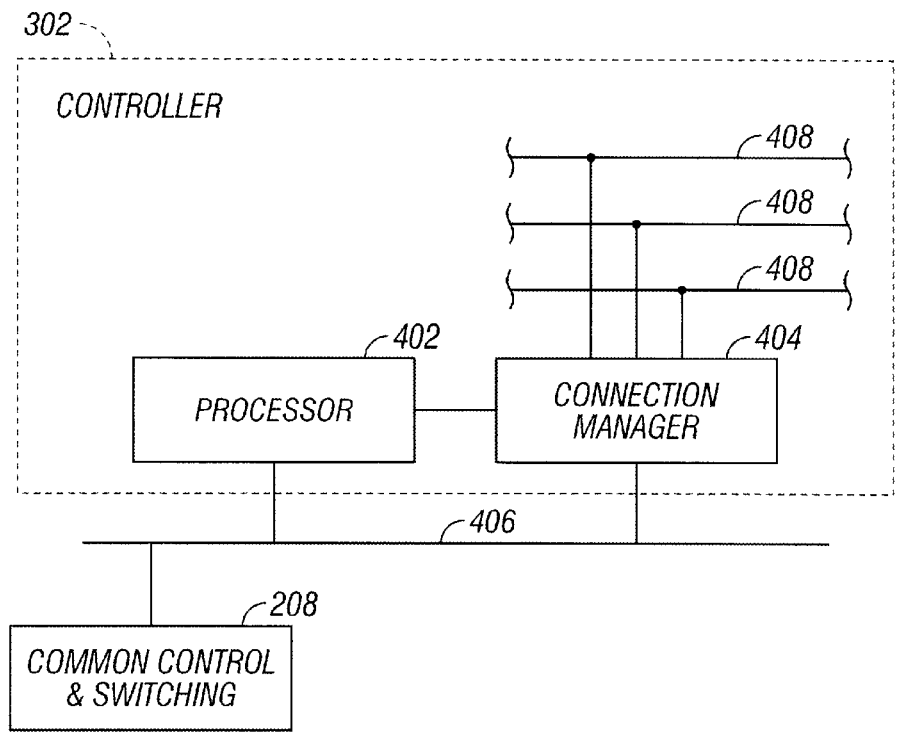
FIG. 4 is a block diagram of controller in accordance with one embodiment of the present invention.

FIG. 4 is a block diagram of controller 302. Controller 302 performs subscriber bus interface functions and modem bank control functions. Controller 302 includes a processor 402 that is coupled to common control/switching system 208 by a suitable connection, such as time slot interchange bus 406. Processor 402 is configured to process telecommunications data, and may be implemented in hardware, software, or a suitable combination of hardware and software. For example, processor 402 may be a Motorola 68360 telecommunications data processor. Processor 402 is operable to control the transfer of data between one or more time slot interchange buses 406.

Controller 302 also includes connection manager 404, which is coupled to processor 402, time slot interchange buses 406, and to subscriber transmit and receive buses 408. Connection manager 404 may be implemented in hardware, software, or a suitable combination of hardware and software. Connection manager 404 transfers data between the time slot interchange buses 406 and subscriber transmit and receive buses 408 in response to control commands received from processor 402. Processor 402 receives signaling and control data from common control/switching system 208, and controls the transfer of data from subscriber transmit and receive buses 408 to time slot interchange bus 406.

Figure 5:
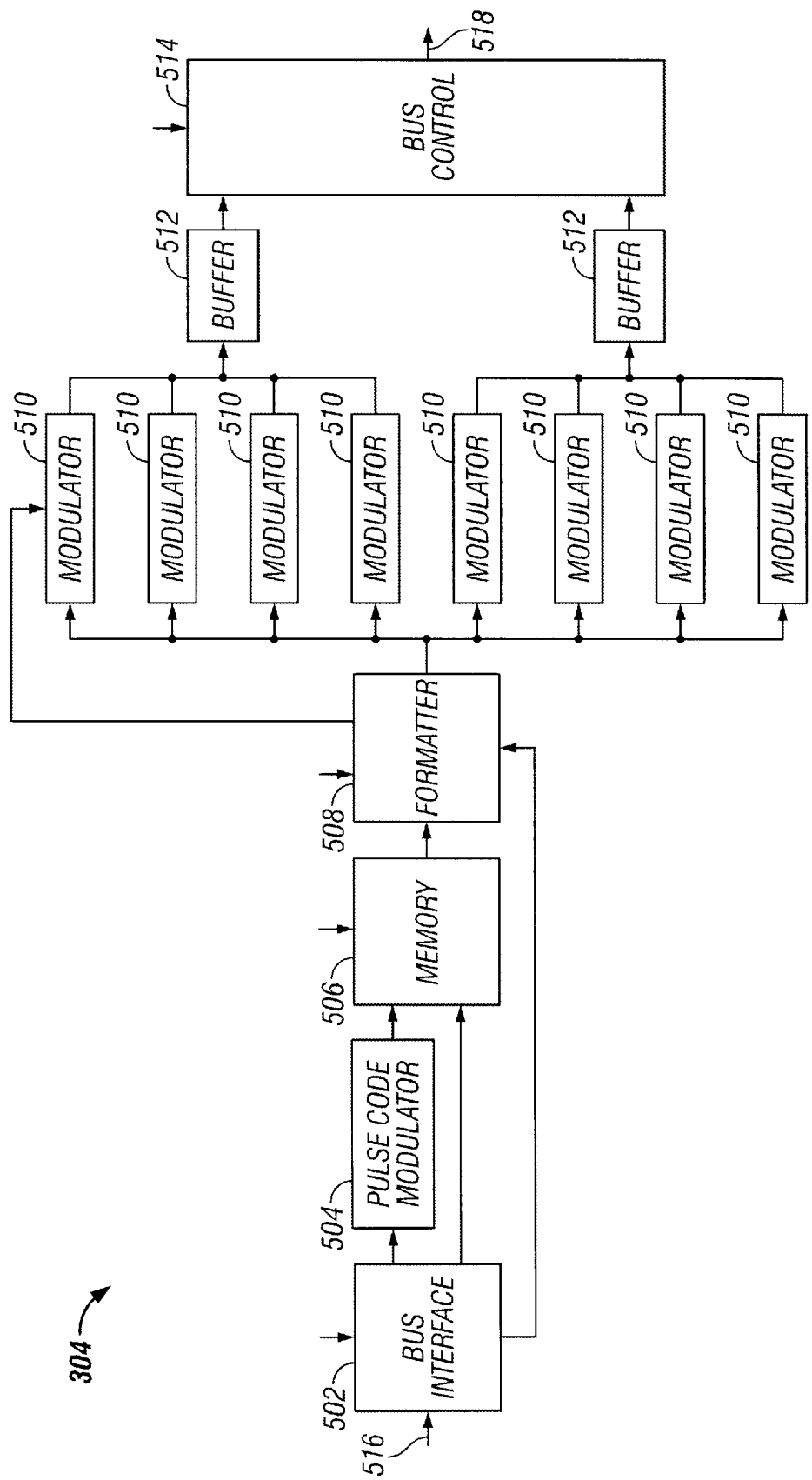
FIG. 5 is a block diagram of an outbound data flow configuration of transport in accordance with one embodiment of the present invention.

FIG. 5 is a block diagram of transport unit 304 showing the outbound telecommunications data flow, in accordance with an embodiment of the present invention. Transport unit 304 includes bus interface 502. Bus interface 502 may be implemented in hardware, software, or a suitable combination of hardware and software. For example, bus interface 502 may be a field programmable gate array or other suitable circuit devices, including but not limited to logic implemented devices. Bus interface 502 is coupled to subscriber bus interfaces 408, and monitors three of the four subscriber bus interface buses. Bus interface 502 also passes formatted data to the pulse code modulator 504. Bus interface 502 combines signaling and radio link data with voice or payload data channels. For example, bus interface 502 may combine eight channels of signaling and radio link overhead information with fifty-six channels of voice data to make a total of sixty-four channels.

Pulse code modulator 504 may be implemented in hardware, software, or a suitable combination of hardware and software. For example, pulse code modulator 504 may be an adaptive differential pulse code modulator circuit, system, integrated circuit, application-specific integrated circuit, or other suitable devices. Pulse code modulator 504 receives channels of voice data, signaling data, and radio link overhead from bus interface 502. Pulse code modulator 504 selectively passes or applies adaptive differential pulse code modulation to the data. Pulse code modulator 504 may be, for example, a Brooktree Adaptive Differential Pulse Code Modulation Processor or other suitable pulse code modulators.

Pulse code modulator 504 and bus interface 502 are coupled to memory 506. Memory 506 may be, for example, a dual port random access memory, or other suitable memory devices. Data is read from pulse code modulator 504 and bus interface 502 to memory 506 in response to control data received from bus interface 502. Address and control signals for writing to memory 506 are processed by bus interface 502.

Memory 506 and bus interface 502 are coupled to formatter 508. Formatter 508 may be implemented in hardware, software, or a suitable combination of hardware and software. For example, formatter 508 may be a field programmable gate array, such as a Xilinx field programmable gate array. Formatter 508 receives data from memory 506 and formats the data in a manner suitable for processing by modulators 510. Formatter 508 coordinates the data for proper sequencing, such that data is transmitted to each of modulators 510 in the correct time slot for the corresponding modulator 510.

Modulator 510 may be implemented in hardware, software, or a suitable combination of hardware and software. For example, modulator 510 may be a Stanford Telecom 2005 application specific integrated circuit, which performs multi-carrier modulation and code division multiple access modulation with Rademacher Walsh codes. Other suitable code division multiple access modulation, time division multiple access modulation, global system for mobile telecommunications modulation, or other modulation formats may also be used where suitable.

In the exemplary embodiment shown in FIG. 5, modulators 510 receive time division multiplex telecommunications data from subscriber buses 408. The time division multiplex telecommunications data is assembled into channels of control data, signaling data, and payload data. The time division multiplex data is then differential quadrature phase-shift keyed and coded, and is then separated into quadrature phase pairs. Modulators 510 then perform code division multiple access modulation on the telecommunications data using Rademacher-Walsh codes. The telecommunications data are further modulated onto independent multiple carrier modulation frequencies.

Modulators 510 are coupled to buffers 512. Buffers 512 may be implemented in hardware, software, or a suitable combination of hardware and software. For example, buffers 512 may be first-in, first-out buffers that are used to make the data transmission rate to bus controller 514 uniform. Bus controller 514 may be implemented in hardware, software, or a suitable combination of hardware and software. Bus controller 514 is coupled to transmitter interfaces 308, and is operable to sum the data output by modulators 510. Bus controller 514 may be a field programmable gate array or another other suitable hardware device.

In operation, telecommunications control data, signaling data, and payload data is received at bus interface 502. The telecommunications control data, signaling data, and payload data may be transmitted to pulse code modulator 504, or may be used to control the storage of data that is output by pulse code modulator 504 to memory 506. In addition, control data received at bus interface 502 is used to control input and output to formatter 508.

Modulators 510 receive the pulse code modulated telecommunications data and perform quadrature phase-shift keying of the data and code division multiple access modulation of the data with Rademacher Walsh codes. Modulators 510 also modulate the telecommunications data onto a multiple carrier modulation format. The output from modulators 510 is transmitted to buffer circuits 512 which sum the data for transmission to bus controller 514 and subsequent transmission to transmitter interfaces 308 of FIG. 3. In this manner, multiple channels of telecommunications data, such as payload data, control data, and signaling data, may be received from a subscriber bus interface and modulated for transmission to one or more subscribers.

Figure 6:
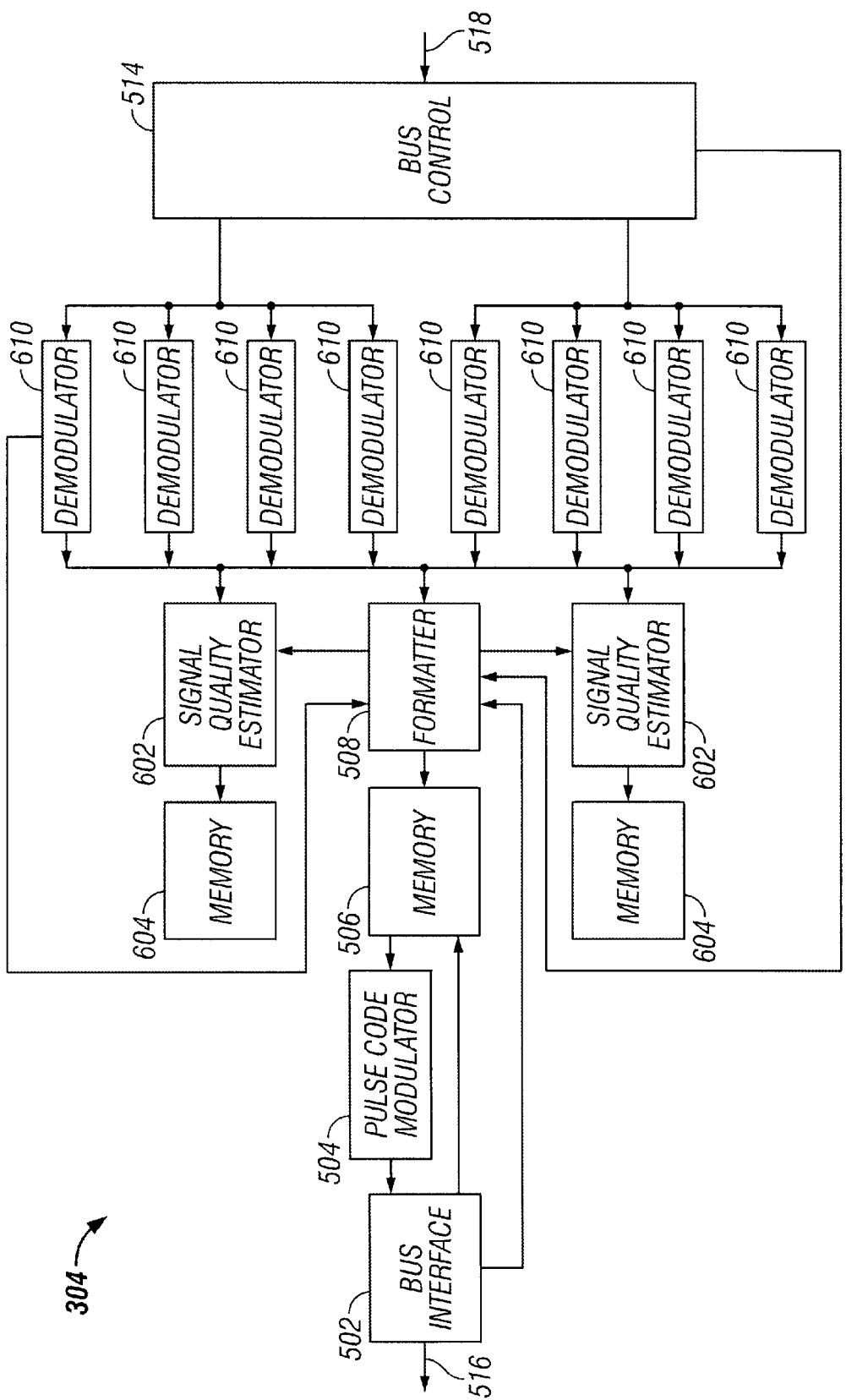
FIG. 6 is a block diagram showing signal flow for inbound signals from transport units in accordance with one embodiment of the present invention.

FIG. 6 is a block diagram of transport unit 304 showing the inbound telecommunications data flow in accordance with an embodiment of the present invention. In the inbound direction, data that has been quadrature phase-shift keyed and modulated with code division multiple access modulation into a multiple carrier modulation format is received at bus controller 514. Bus controller 514 transmits the modulated data to demodulators 610, which demodulate the data from the received format into a pulse code modulated format. All eight demodulators 610 output demodulated data in parallel after the acquisition of the data from bus controller 514. Formatter 508 receives clock data from one of demodulators 610 to control differentiation of data output from demodulators 610. In addition, formatter 508 transmits a synchronization signal to bus controller 514.

Demodulators 610 output the demodulated data to formatter and signal quality estimators 602. Signal quality estimators 602 may be implemented in hardware, software, or a suitable combination of hardware and software, and are used to analyze radio channel performance. For example, signal quality estimators 602 may each be implemented as programming within a field programmable gate array. Information derived from signal quality estimators 602 may be converted into control data and used to modify system variables to control signal quality, such as subscriber unit amplification power. The demodulated data is transmitted from formatter 508 to memory 506 for pulse code demodulation by pulse code modulator 504. The demodulated data is then transmitted to the subscriber bus interfaces through bus interface 502.

In operation, modulated trunk groups of telecommunications data signals are received at each transport unit 304. The telecommunications data signals are demodulated and transferred to subscriber bus interfaces for additional processing. In addition, the signal quality of the received signal is estimated, and control data developed in response to the signal quality estimation is used to control system variables so as to improve signal quality.

Figure 7:
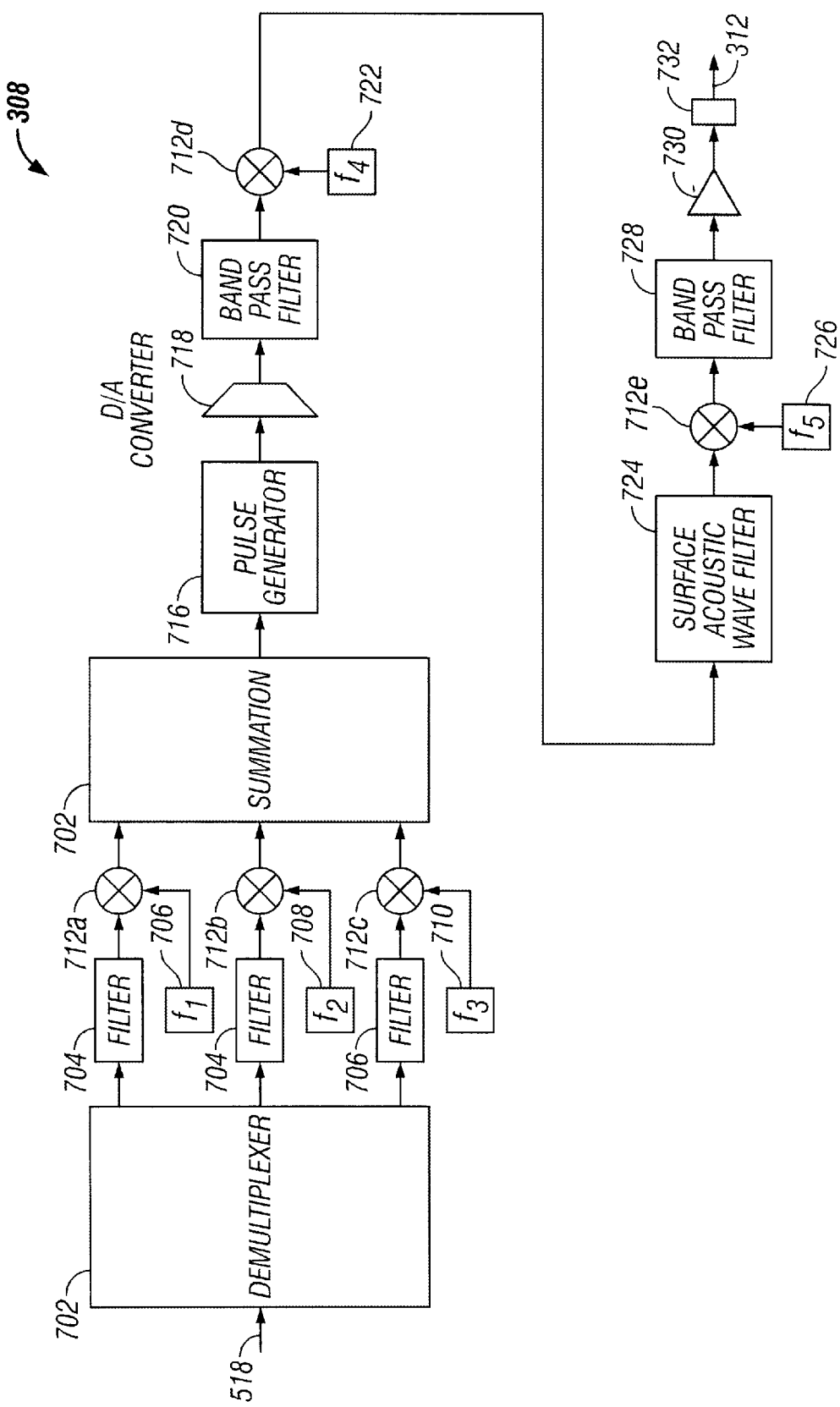
FIG. 7 is a block diagram of a transmitter interface in accordance with one embodiment of the present invention.

FIG. 7 is a block diagram of transmitter interface 308 in accordance with an embodiment of the present invention. Transmitter interface 308 receives one or more trunk groups of modulated telecommunications data and converts the time division multiplex data into one or more analog signals that are transferred to radio frequency assembly 216 for subsequent transmission to subscriber terminals 220.

Telecommunications data that has been modulated into a suitable format for transmission is received from transport units 304 via transport unit output 518 at demultiplexer 702. Demultiplexer 702 may be coupled to transport unit output 518 by a real connection, such as an electrical or optical connector, or by a virtual connection, such as a logical connection formed in the logical circuitry of a processor. Demultiplexer 702 may be implemented in hardware, software, or a suitable combination of hardware and software. For example, demultiplexer 702 may be a field programmable gate array. Demultiplexer 702 separates the data received from transport units 304 into three sets of trunk groups, wherein each set contains one or two trunk groups. The trunk group sets are then transmitted to trunk group translators 740, 744, and 746.

Trunk group translators 740, 744, and 746 are used to translate the trunk group sets up in frequency so as to create a signal having a predetermined bandwidth and center frequency. Trunk group translators 740, 744, and 746 include filters 704a, 704b, and 704c, respectively, frequency generators 706, 708, and 710, respectively, and adders 712a, 712b, and 712c, respectively.

Filters 704a, 704b, and 704c may be implemented in hardware, software, or a suitable combination of hardware and software. For example, filters 704a, 704b, and 704c may be Harris finite impulse response filters. After the trunk group signals are processed by filters 704a, 704b, and 704c, they are modulated by one of the frequencies generated by frequency generators 706, 708, and 710, through adders 712a, 712b, and 712c. Frequency generators 706, 708, and 710 may be implemented in hardware, software, or a suitable combination of hardware and software. For example, frequency generators 706, 708, and 710 may be Stanford Telecom dual numerically controlled oscillators. Adders 712a, 712b, and 712c may be implemented in hardware, software, or a suitable combination of hardware and software. For example, adders 712a, 712b, and 712c may be implemented with programmable read-only memories.

The output of adders 712a, 712b, and 712c is summed through summation unit 714. Summation unit 714 may be implemented in hardware, software, or a suitable combination of hardware and software. For example, summation unit 714 may be a field programmable gate array. The signal generated in response to the summation of the trunk group sets is then fed through pulse generator 716 into digital to analog converter 718. Pulse generator 716 and digital to analog converter 718 may be implemented in hardware, software, or a suitable combination of hardware and software. For example, digital to analog converter 718 may be a SONY 8 bit 40 MHZ digital to analog converter. Pulse generator 716 adds harmonic content to allow the digital data to be translated to a higher frequency.

The output of digital to analog converter 718 is filtered through band pass filter 720, and then modulated by frequency output by frequency generator 722 through adder 712d. Band pass filter 720, frequency generator 722, and adder 712d may each be implemented in hardware, software, or a suitable combination of hardware and software. For example, band pass filter 720 may be a six pole Chebyshev analog filter, frequency generator 722 may be a National Semiconductor 1.1 gigahertz frequency synthesizer, and adder 712d may be implemented with a programmable read-only memory. The output of adder 712d is then filtered through surface acoustic wave filter 724 and is modulated further by frequency generated by frequency generator 726 through adder 712e. The output of adder 712e is then filtered through band pass filter 728 and is further processed by operational amplifier 730 and output interface 732.

Figure 8:
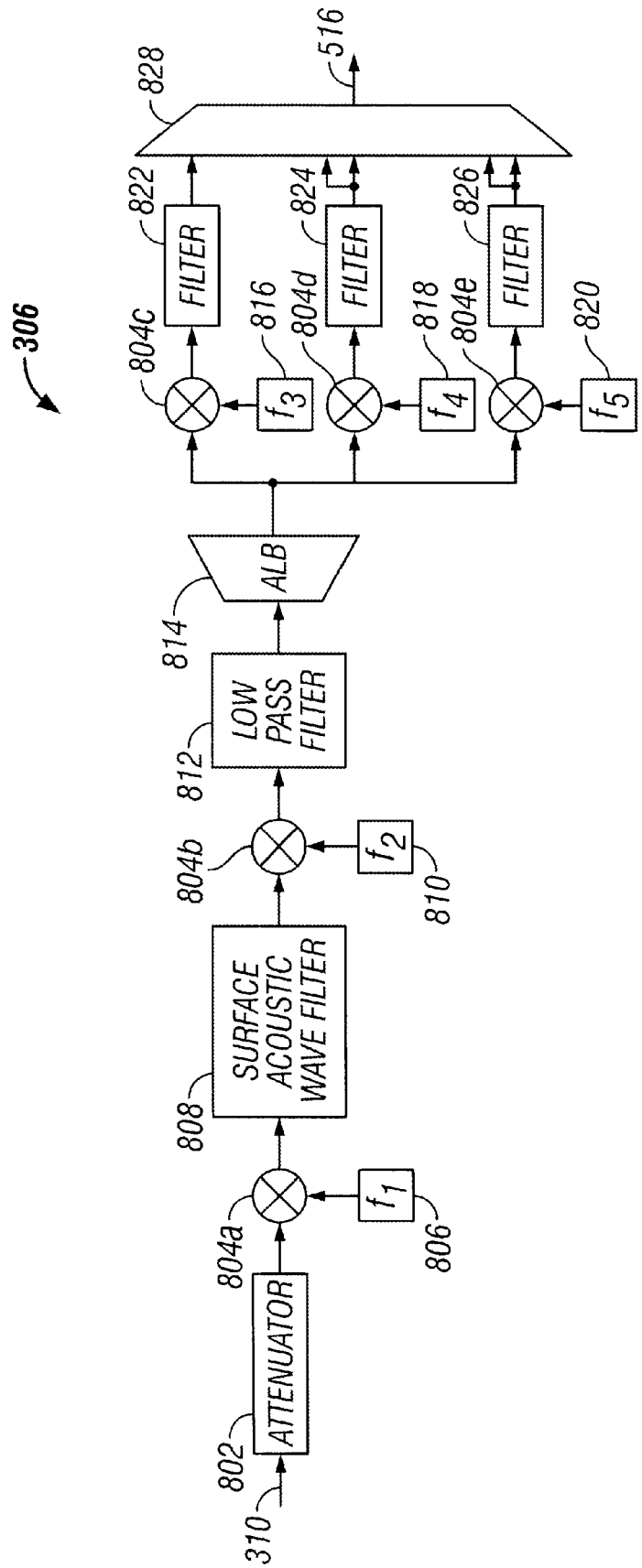
FIG. 8 is a block diagram of a receiver interface in accordance with teachings of the present invention.

FIG. 8 is a block diagram of receiver interface 306 in accordance with one embodiment of the present invention. Receiver interface 306 receives analog signals carrying encoded telecommunications data and converts the analog signals into five trunk groups of encoded data signals.

Receiver interface 306 includes variable attenuator 802. Variable attenuator 802 may be implemented in hardware, software, or a suitable combination of hardware and software. Variable attenuator 802 receives an analog signal from input 310 and adjusts for gain variations by monitoring the output of the digital to analog converters. The output of variable attenuator 802 is modulated by reference frequency 806 through adder 804a, to down convert the selected channels to have a center frequency of 70 megahertz. The output of adder 804a is then filtered through a surface acoustic wave filter 808, and is again translated down to a signal having a center frequency of 2.304 megahertz by adder 804b using reference frequency 810.

The output of adder 804b is then filtered through low pass filter 812 and is transmitted to analog to digital converter 814. Analog to digital converter 814 may be, for example, a Sony 8-bit 40 MHZ analog to digital converter circuit. The output of analog to digital converter 814 is then separated into trunk group signals by trunk group converters 840, 842, and 844. Each trunk group converter is operable to down-convert the output of analog to digital converter 814 to a signal having a predetermined center frequency, and to filter other trunk group signals from the down-converted signal, so as to isolate one or two trunk groups of signals.

For example, trunk group converters 840, 842, and 844 may comprise center frequency generators 816, 818, and 820, respectively, and adders 804c, 804d, and 804e, respectively. Center frequency generators 816, 818, and 820 may be implemented in hardware, software, or a suitable combination of hardware and software. For example, the center frequency generators may be dual numerical controlled oscillators. Adders 804c, 804d, and 804e may be implemented in hardware, software, or a suitable combination of hardware and software. For example, adders 804c, 804d, and 804e may be implemented in erasable programmable read-only memory devices. The output of analog-to-digital converter 814 is combined with the center frequencies generated by center frequency generators 816, 818, and 820 by adders 804c, 804d, and 804e, respectively.

Trunk group converters 840, 842, and 844 may also comprise filters 822, 824, and 826, respectively. Filters 822, 824, and 826 may be implemented in hardware, software, or a suitable combination of hardware and software. For example, filters 822, 824, and 826 may be implemented as Harris finite impulse response filters. The output of adders 804c, 804d, and 804e is filtered through filters 822, 824, and 826, to create five trunk groups. The five trunk groups are then fed into multiplexer 828, which generates transport unit input signal channel 516. Multiplexer 828 may be implemented in hardware, software, or a suitable combination of hardware and software. For example, multiplexer 828 may be a Xilinx field programmable gate array.

In operation, an analog signal is received via an antenna from a plurality of subscriber circuits. The analog signal is transmitted to receiver interface 306, for separation into trunk groups of signals for additional processing by transport units 304. Receiver interface 306 separates the analog signal by first down-converting from transmission frequency to a processing frequency, then by converting the signal from analog to digital, and then by separating the trunk group signals from the converted signal. The trunk groups are then transmitted to transport units 304 for further demodulation processing to extract data that has been encoded into telecommunications channels carried over the analog channel.

FIGS. 9a through 9e are a flow chart of an exemplary method 900 for providing wireless telecommunications access in accordance with an embodiment of the present invention. Method 900 may be used to provide wireless telecommunications access in a system that provides both wireline and wireless telecommunications access, or may alternatively be used in a system that provides stand-alone wireless telecommunications access.

Method 900 starts at step 902, where a transmitted signal that includes one or more trunk groups is received from one or more subscriber terminals. The transmitted signal is then demodulated to separate the individual trunk groups for subsequent processing. An exemplary process for demodulating the transmitted signal is provided by FIG. 9b. At step 906 of FIG. 9b, the signal is first converted from an analog signal to a digital signal. The center frequency of the digital signal is then frequency shifted by one or more frequencies to isolate the trunk groups, such as into three trunk group sets. The trunk group sets are then filtered at step 910, to provide individual trunk group signals.

After demodulation of the trunk group signals at step 904, the method proceeds to step 912 where channels of telecommunications data are demodulated from each trunk group. An exemplary method for demodulating the individual channels of telecommunications data is provided by FIG. 9c. At step 914 of FIG. 9c, each trunk group signal is demodulated using multiple carrier demodulation, such as to isolate data that has been encoded into each of a plurality of carriers. The method then proceeds to step 916, where the trunk group data is demodulated using a suitable code division multiple access demodulation, such as a Rademacher-Walsh code division multiple access demodulation. The method then proceeds to step 918, where the trunk group data is demodulated by using a quadrature phase-shift keying demodulation. The method then proceeds to step 920, where the trunk group data is demodulated using pulse code demodulation. The resulting trunk group data may then be processed as channels of digitally-encoded data.

After channel demodulation of the trunk group data is performed at step 912, the method proceeds to step 922 where the individual channels of telecommunications data are transmitted to the other party or parties. For example, the channels of telecommunications data may include voice channels between two persons, a conference call between three or more persons, data channels between two devices, or other suitable telecommunications data. The telecommunications data for each channel is transmitted to the appropriate party at step 922.

Figure 9A:
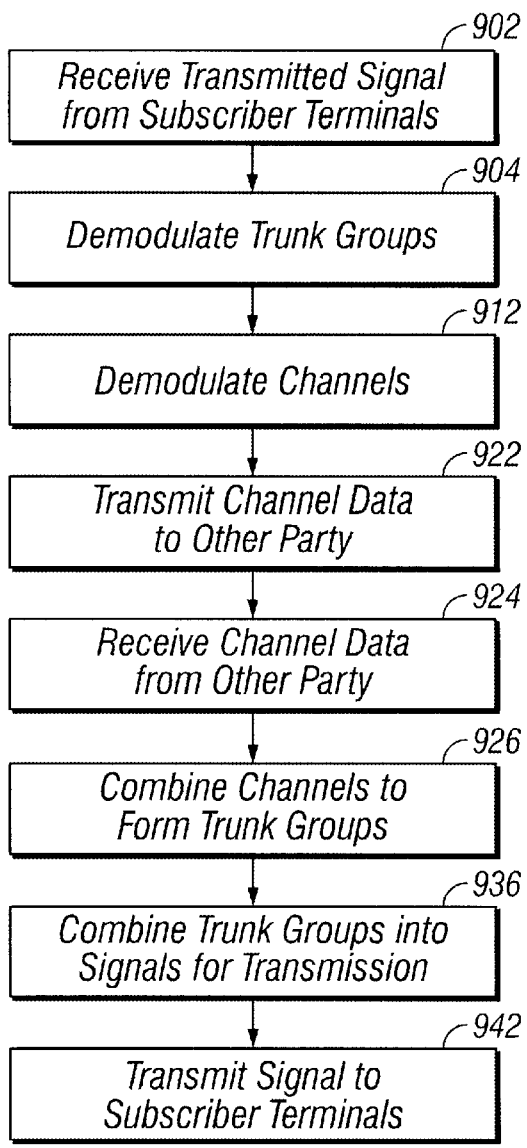
FIGS. 9a through 9e present an exemplary method for providing telecommunications access in accordance with one embodiment of the present invention.
Figure 9B:
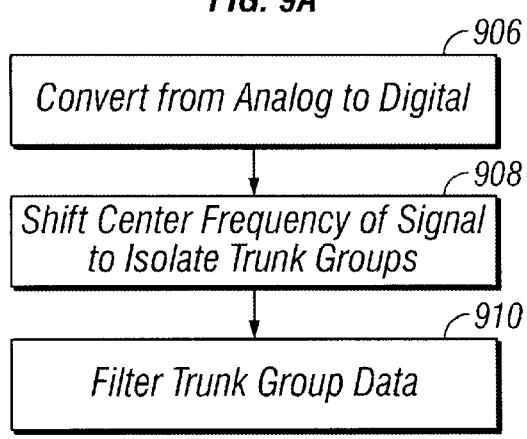
Figure 9C:
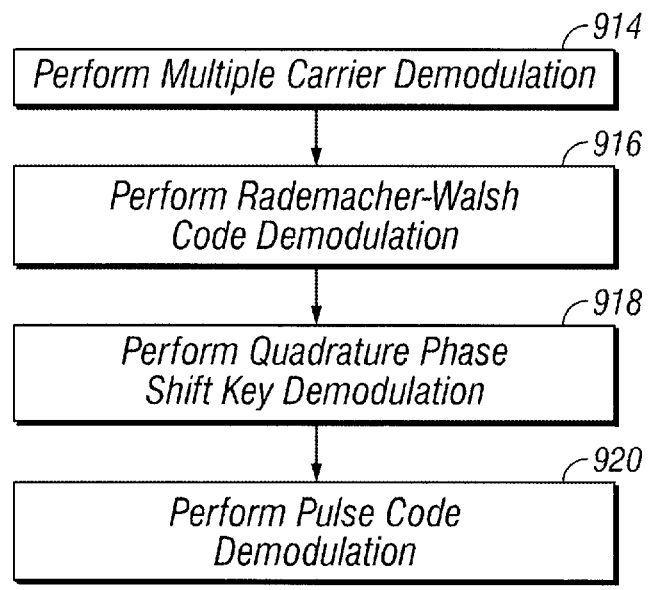
Figure 9D:
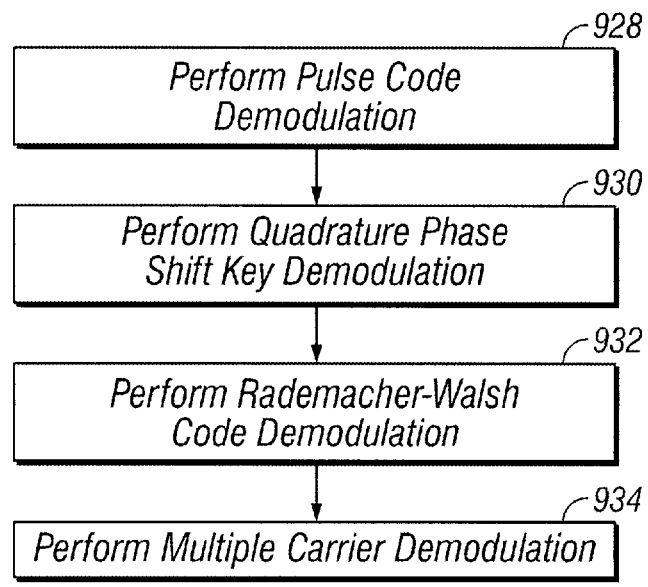
Figure 9E:
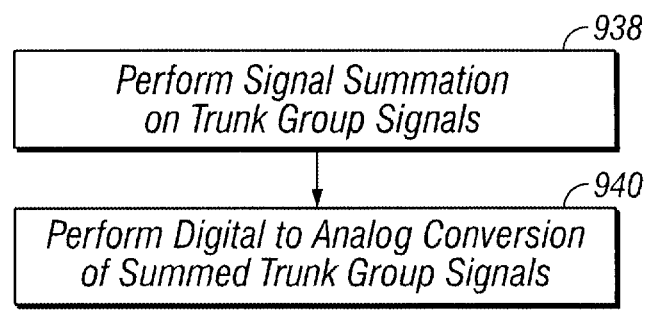

At step 924, channels of telecommunications data are received from the other parties, such as voice communications from one or more other persons, data from one or more other devices, or other suitable data. The method then proceeds to step 926 where the channels of telecommunications data are combined to form trunk groups. An exemplary method for combining the telecommunications channels into trunk groups is shown in FIG. 9d. At step 928 of FIG. 9d, the data from the channels of telecommunications data are pulse code modulated. The method then proceeds to step 930, where the data is quadrature phase-shift keyed. A suitable code division multiple access modulation is then performed on the data at step 932, such as a Rademacher-Walsh code division multiple access modulation. The method then proceeds to step 934 where multiple carrier modulation is performed on the channels of telecommunications data.

After the channels of telecommunications data are combined to form trunk groups at step 926, the method proceeds to step 936 where the one or more trunk group signals are combined to form a single signal for transmission to the subscriber terminals. An exemplary method for combining the one or more trunk group signals is provided in FIG. 9e. At step 938 of FIG. 9e, signal summation is performed the individual trunk group signals. A digital to analog conversion is then performed on the summed signals at step 940.

After the trunk groups are combined into a single signal for transmission at step 936, the method proceeds to step 942 where the combined signal is transmitted to one or more subscriber terminals. The subscriber terminals then perform a similar demodulation of the inbound data and modulation of the outbound data as described above in relation to the modulation and demodulation performed at the access unit.

Figure 10:
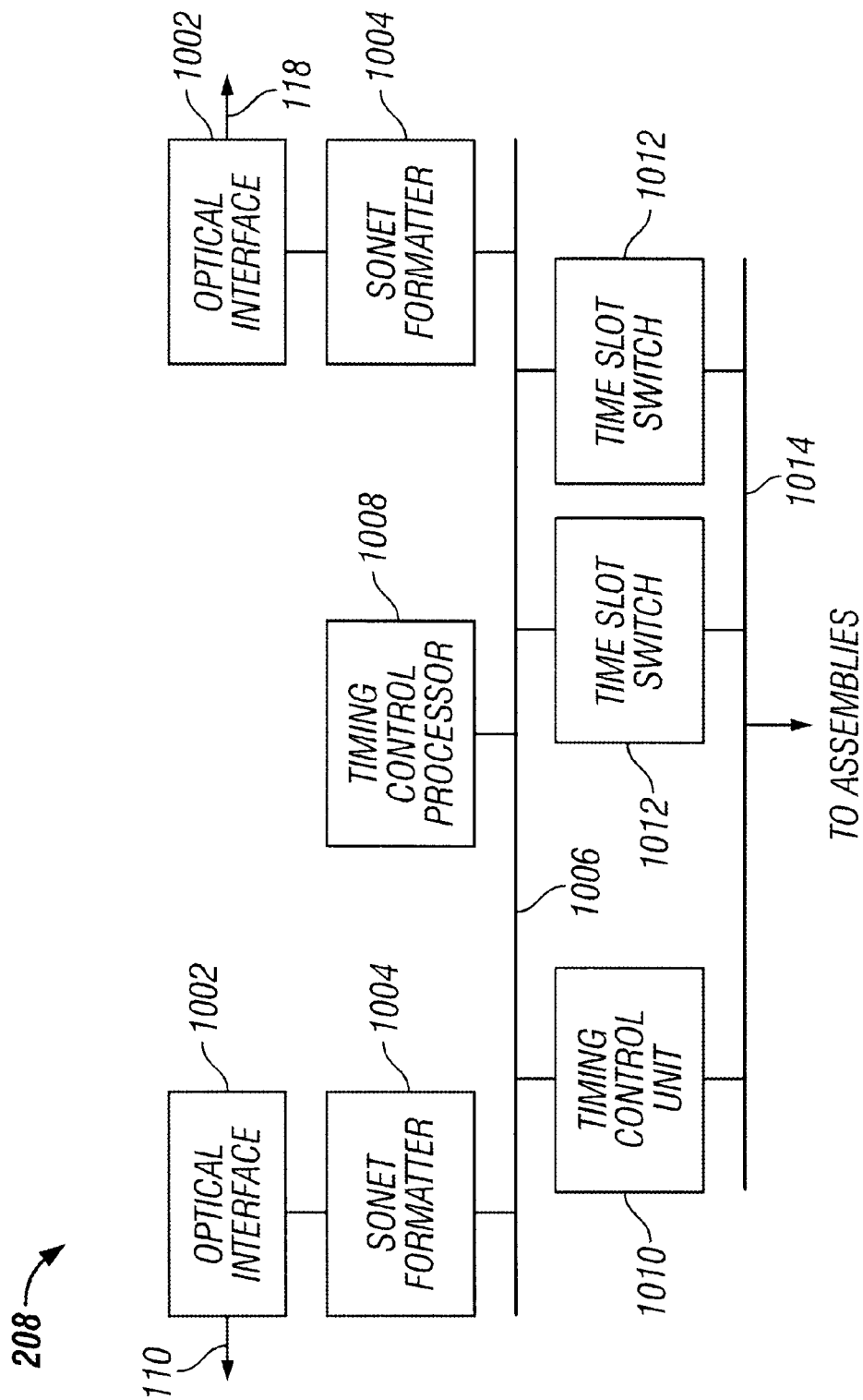
FIG. 10 is a block diagram of a common control/switching system embodying concepts of the present invention.

FIG. 10 is a block diagram of common control/switching system 208 embodying concepts of the present invention. Common control/switching system 208 is used to interface west fiber optic feeder 110 and east fiber optic feeder 118 to wireline assembly 210 and wireless assembly 214.

Common control/switching system 208 includes optical interfaces 1002. Optical interfaces 1002 are operable to receive an optical signal from a suitable optical signal conductor, and to convert the optical signal into electrical signals for subsequent processing. For example, optical interfaces 1002 may include high speed optical to electrical converters, data buffer systems, clock systems, diagnostic systems, and high speed data bus systems. Optical interfaces 1002 are coupled to SONET formatters 1004.

SONET formatters 1004 may be implemented in hardware, software, or a suitable combination of a hardware and software. SONET formatters 1004 are operable to receive electrical signals from optical interfaces 1002 convert the signals into a signal that is compatible with a SONET format. For example, SONET formatters 1004 may include a controller system, data buffer systems, and high speed data bus systems. In addition to or alternatively, other suitable data formats may be used, including but not limited proprietary data formats and standard data formats. SONET formatters 1004 are coupled to bus 1006.

Bus 1006 is a suitable high speed data transfer bus for use with common control/switching system 208. For example, bus 1006 may include a control bus structure, a data bus structure, timing bus structure, and other suitable bus structures. Bus 1006 is used to transfer data between the components of common control/switching system 208.

Timing control processor 1008 is coupled to bus 1006. Timing control processor 1008 may be implemented in hardware, software, or a suitable combination of hardware and software. Timing control processor is operable to control the timing on bus 1006. The timing for bus 1006 must be controlled to within a precise tolerance in order to maintain functionality of common control/switching system 208. Timing control processor 1008 controls the timing of common control/switching system 208 by controlling data transfer over bus 1006.

Timing control unit 1010 is coupled to bus 1006. Timing control unit 1010 may be implemented in hardware, software, or a suitable combination of hardware and software. Timing control unit 1010 is also coupled to bank unit conductors 1014. Timing control unit 1010 is used to synchronize data transfer between common control/switching system 208 and the bank control units of wireline assembly 210 and wireless assembly 214. For example, timing control unit 1010 may transfer a timing signal that is used to coordinate data received from time slot switches 1012 over bank unit conductors 1014.

Common control/switching system 208 also includes time slot switches 1012. Time slot switches 1012 may be implemented in hardware, software, or a suitable combination of hardware and software. For example, time slot switches 1012 may include time slot interchange random access memories and suitable control systems for switching telecommunications data through the time slot interchange random access memories. Time slot switches 1012 are coupled to bus 1006 and bank unit conductors 1014. Data is transferred from bus 1006 to bank unit conductors 1014 by storing the data in predetermined memory locations of time slot switches 1012, and by writing the data from these predetermined memory locations to bank unit conductors 1014. The predetermined memory locations may be dynamically assigned, but will be predetermined prior to transferring the data from bus 1006 to bank unit conductors 1014.

Likewise, time slot switches may transfer data from bank unit conductors 1014 to bus 1006, from a time slot on bus 1006 to a different time slot on bus 1006, or from a time slot on bank unit conductors 1014 to a different time slot on bank unit conductors 1014. In this manner, switching between the switched network, the wireline assembly 210, and the wireless assembly 214 is accomplished by time slot switches 1012.

In operation, optical data is received over west fiber optic feeder 110 and east fiber optic feeder 118 at optical interfaces 1002. Optical interfaces 1002 convert the optical data to electrical signals, and transmit the electrical signals to SONET formatters 1004. SONET formatters 1004 package the electrical signals received from optical interface 1002 in a predetermined data format, and transmit the data over bus 1006 to time slot switches 1012, timing control unit 1010, and timing control processor 1008. Timing control processor 1008 and timing control unit 1010 are used to control the timing of components of common control/switching system 208 and other components of access unit 100, such that operation of all components may be coordinated to allow data transfer to occur without interruption.

Time slot switches 1012 receive telecommunication data from bus 1006 and transfer telecommunications data to bus 1006. Furthermore, time slot switches 1012 transfer the telecommunications channel data to the bank control interface 1014. In this manner, telecommunications channels may be established through common control/switching assembly 208 from west fiber optic feeder 110 and east fiber optic feeder 118 to wireless assembly 214 and wireline assembly 210. The telecommunications channel may be switched as appropriate by time slot switches 1012.

Figure 11:
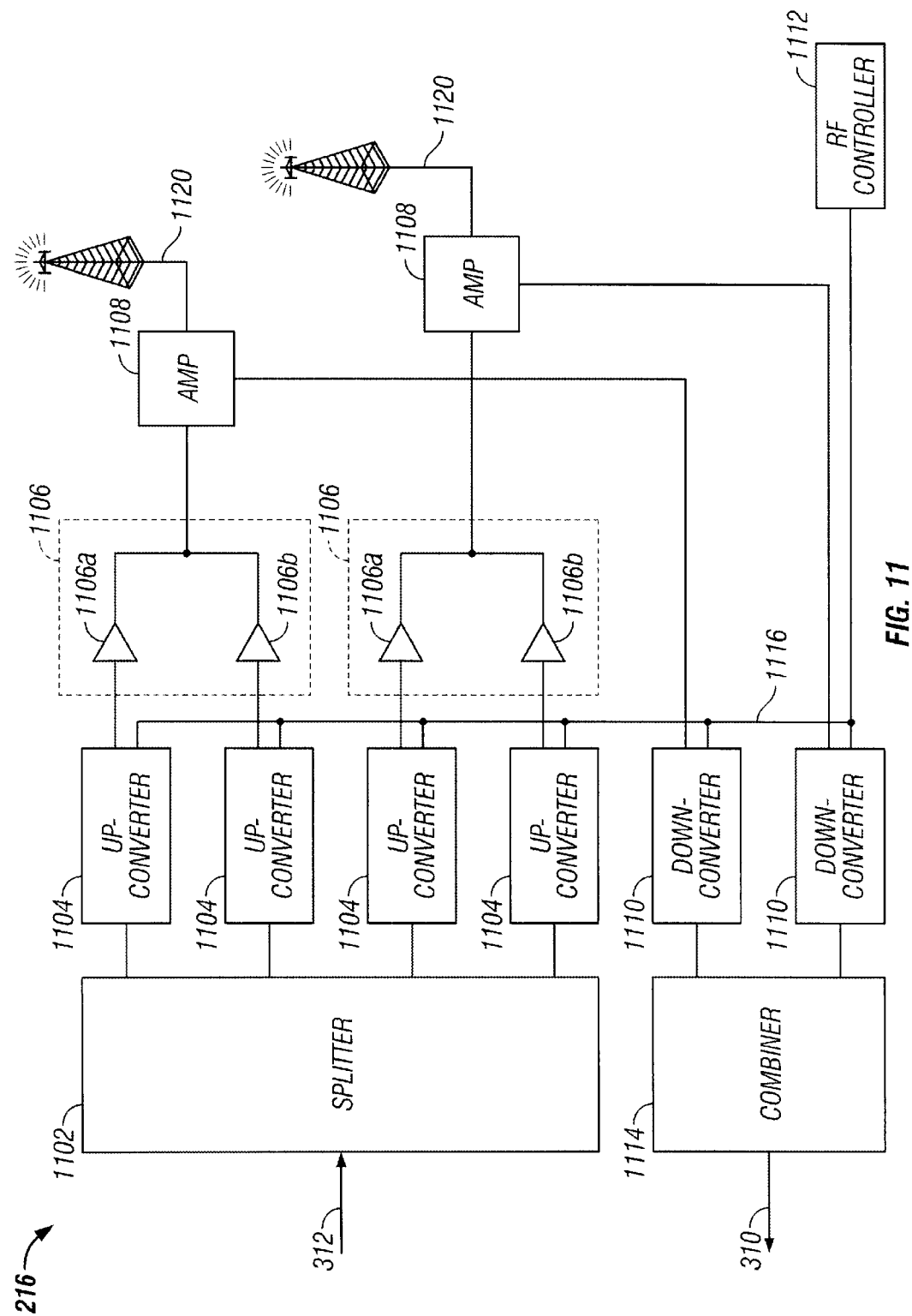
FIG. 11 is a block diagram of a radio frequency assembly in accordance with an embodiment of the present invention.

FIG. 11 is a block diagram of a radio frequency assembly 216 in accordance with an embodiment of the present invention. Radio frequency assembly 216 is used to transmit encoded data signals from wireless assembly 214 to subscriber terminals 220 via radio frequency channels, and to receive radio frequency channels from subscriber terminals 220 for transfer to wireless assembly 214.

Radio frequency assembly 216 includes splitter 1102, which is coupled to wireless assembly 214 via output 312. Splitter 1102 may be implemented in hardware, software, or a suitable combination of hardware and software. Splitter 1102 is a passive reciprocal device that accepts an input signal and delivers multiple outputs that are equal in phase and magnitude. Splitter 1102 receives outbound modulated radio frequency signals from wireless assembly 214 and splits the signal into four paths. Each path is connected to an up-converter 1104.

Each up-converter 1104 may be implemented in hardware, software, or a suitable combination of hardware and software. Each up-converter 1104 may be programmed by the radio frequency controller 1112 to select one of the four intermediate frequency signals and to translate it to a designated radio frequency channel at a predetermined frequency, such as two gigahertz. The frequencies used in the up-conversion process are phase locked to one of the 14 MHz reference signals supplied by the two down-converters 1110. Each up-converter 1104 output consists of a predetermined frequency band of code divisional multiple access signals that are encoded with telecommunications data. For example, a 3.5 MHz frequency bandwidth may be used that includes 160 Rademacher-Walsh code signal channels, where 140 signal channels are used for 32 kilobyte per second voice data, and 20 signal channels are used for signaling and control data.

Each up-converter 1104 is coupled to an amplifier 1106a or 1106b of a twin amplifier assembly 1106, which amplifies the output of the associated up-converter 1104. The twin amplifier assemblies 1106 provide two amplifiers 1106a and 1106b with combined outputs that are connected to a duplexer/low noise amplifier 1108. Each duplexer/low noise amplifier 1108 transmits and receives signals from an omni antenna. A transmit filter in each duplexer/low noise amplifier 1108 couples the transmit signals to the omni antenna 1120. A receive filter in each duplexer/low noise amplifier 1108 prevents the transmit signal from coupling to the signal received from omni antenna 1120 through the low noise amplifier.

The radio frequency signals received at omni antenna 1120 are processed by the low noise amplifier of duplexer/low noise amplifier 1108 such that they are displaced from the transmit signals by a predetermined frequency magnitude, such as 175 megahertz. The duplexer/low noise amplifier 1108 amplifies a predetermined bandwidth of radio frequency signals, such as a 45 MHz band, which further include a predetermined number of radio frequency channels, by a predetermined magnitude increase. For example, the duplexer/low noise amplifier 1108 may increase the amplitude of a 12 channel frequency band by 20 dB. These amplified signals are then transferred to downconverters 1110.

Each down-converter 1110 may be implemented in hardware, software, or a suitable combination of hardware and software. Each down-converter 1110 translates the amplified signals received from duplexer/low noise amplifier 1108 to a predetermined intermediate frequency, such as one centered at 280 MHz. A predetermined number of the channels of the signal channels contain data signals received from the subscriber terminals 220, such as 4 of the 12 channels. Each of the down-converters 1110 outputs a signal containing data from all of the subscriber terminals 220, such that the output of one down converter 1110 may be switched off and used for backup while the other down converter 1110 supplies the intermediate frequency signals to the wireless bank assembly shelf 214.

Radio frequency controller 1112 is coupled to each up-converter 1104 and each down-converter 1110, and controls the center frequency conversion of the signals processed by up-converters 1104 and down-converters 1112. Radio frequency controller 1112 may be implemented in hardware, software, or a suitable combination of hardware and software. Radio frequency controller 1112 stores provisioning data for the components of radio frequency assembly 216, and automatically provisions the components upon restoration of power. Radio frequency controller 1112 also provides status information on the components of radio frequency assembly 1112 to the wireless assembly 214, such as whether a component fails or is removed.

In operation, radio frequency assembly 216 is used to transmit data to subscriber units 220 from an access unit 100 that is used to provide wireline and wireless telecommunications services, such as voice communications, facsimile communications, data communications, video communications, or other suitable telecommunications services. Radio frequency assembly 216 receives a modulated signal for transmission from wireless assembly 214, splits the modulated signal into redundant channels, and up-converts the modulated signals to transmission frequency. The modulated signals are then transmitted to subscriber terminals 220.

The subscriber terminals 220 transmit response modulated signals that are received by the radio frequency assembly 216. The response modulated signals are amplified by the radio frequency assembly 216 and down-converted for transmission to the wireless assembly 214. Redundant components are used in the up-conversion and down-conversion process to prevent a single component failure from causing radio frequency assembly 216 failure. Radio frequency controller 1112 controls the operation of the up-converters and down-converters.

Figure 12:
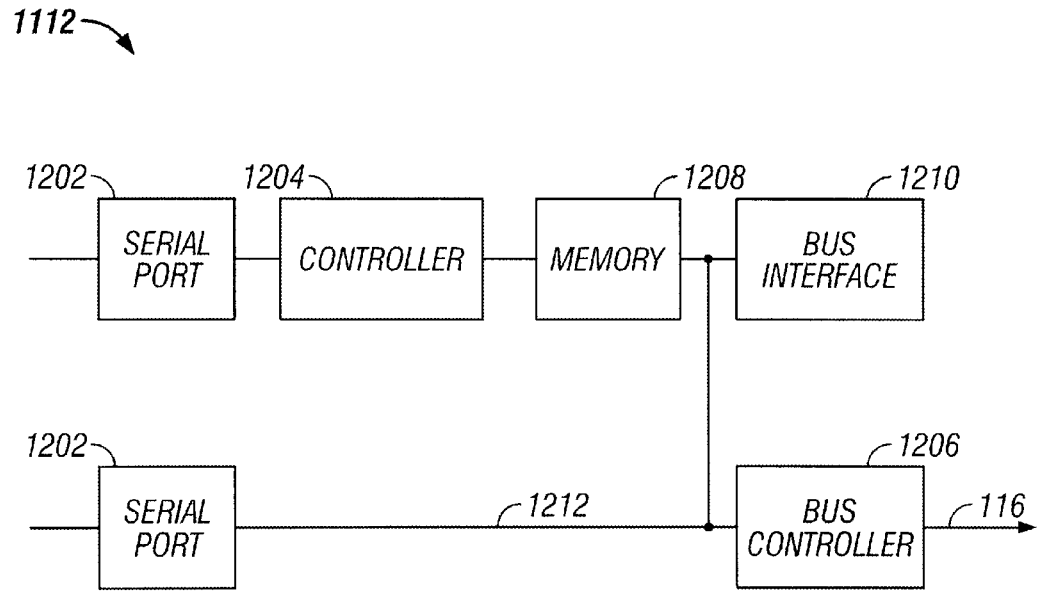
FIG. 12 is a block diagram of a radio frequency controller in accordance with an embodiment of the present invention.

FIG. 12 is a block diagram of a radio frequency controller 1112 in accordance with an embodiment of the present invention. Radio frequency controller 1112 is used to control the operation of up-converters 1104 and down-converters 1110 in radio frequency assembly 216, and to perform additional operations and controls functions for radio frequency assembly 216.

Radio frequency controller 1112 includes serial ports 1202, which are coupled to controller 1204 via bus 1212. Serial ports 1202 are used to interface with wireless assembly 214. Controller 1204 may be implemented in hardware, software, or a suitable combination of hardware and software. By way of example and not by limitation, controller 1204 may be an MC68HC11, which provides 16 bits of address data processing capability, one asynchronous serial communications port, one synchronous serial communication port, and an eight channel, eight bit analog to digital converter. The synchronous serial port interfaces are used as an interface for the common language equipment identifier data. Bus controller 1206 is used to implement serial bus connections to up-converters 1104 and down-converters 1110. Controller 1204 is coupled to memory 1208, which is used to store data from bus receivers 1210 and controller 1204, and is also used to store provisioning data for the components of radio frequency assembly 216.

Figure 13:
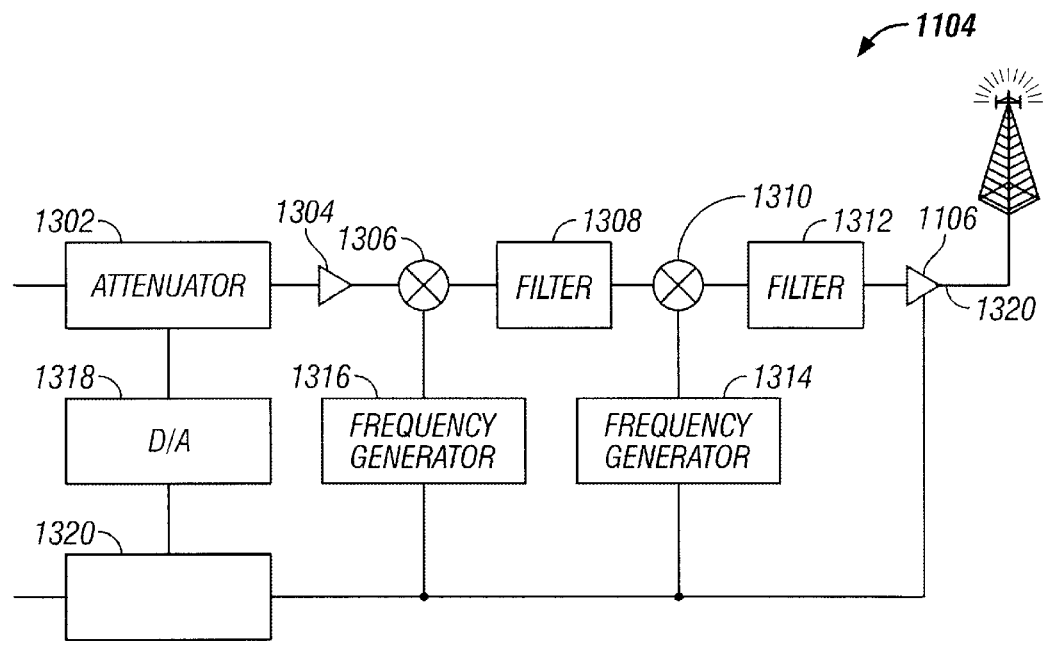
FIG. 13 is a block diagram of an up-converter embodying concepts of the present invention.

FIG. 13 is a block diagram of an up-converter 1104 embodying concepts of the present invention. Up-converter 1104 may be implemented in hardware, software, or a suitable combination of hardware and software.

Up-converter 1104 includes an attenuator 1302. Attenuator 1302 may be implemented in hardware, software or a suitable combination of hardware and software. Attenuator 1302 is used to adjust the power output of the up converter module to compensate for cable loss, manufacturing and temperature variations. Attenuator 1302 is coupled to amplifier 1304, which is coupled to adder 1306. Adder 1306 shifts the frequency of the output of amplifier 1304 by the frequency output of frequency generator 1316. The shifted output signal is then transmitted to filter 1308.

Filter 1308 is a suitable band pass filter, such as a surface acoustic wave filter. The output of filter 1308 is transmitted to adder 1310, which shifts the center frequency of the signal by the amount of frequency generator 1314. The output of adder 1310 is then filtered through filter 1312, and transmitted to amplifier 1106 for transmission through antenna 1320.

Timing monitor bus interface 1320 is coupled to frequency generators 1314 and 1316, and provides a 14 MHz timing signal to the frequency generators. Monitor bus interface 1320 is also coupled to attenuator 1302 through digital to analog converter 1318, to provide level control attenuator 1302.

In operation, up conversion in two stages is performed to select one to two adjacent frequency bands, such as 3.5 MHz frequency bands, and to translate them to a suitable transmit frequency. A suitable number of intermediate frequency signals in a suitable frequency band are first translated to a second intermediate and filtered through a band-pass filter. A single intermediate frequency is generated by a suitable means, such as a digital phase-locked loop synthesizer operating in the 1180 to 1247.7 MHz frequency range. The low sideband of the mixing products and a suitable number of frequency slots are selected, such as by processing with a low bandpass filter followed by a gain stage and a narrow bandpass filter.

Figure 14:
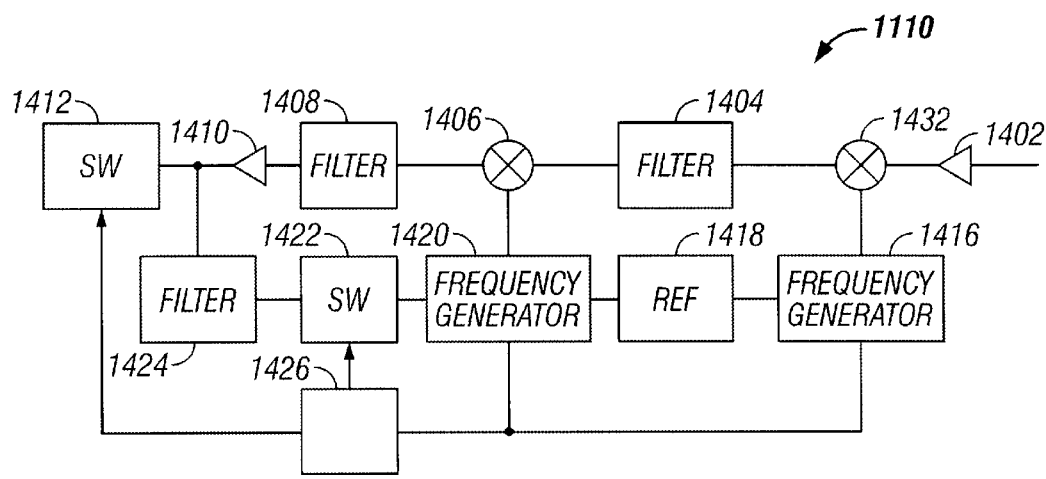
FIG. 14 is a block diagram of a down-converter in accordance with an embodiment of the present invention.

FIG. 14 is a block diagram of down-converter 1110 in accordance with an embodiment of the present invention. Down-converter 1110 is used to convert a signal carrying encoded data from a transmit radio frequency signal to a frequency more suitable for processing by components of access unit 100.

Down-converter 1110 includes amplifier 1402, which receives the radio frequency signal and boosts the gain of the signal for subsequent processing by down-converter 1110. The output of amplifier 1402 is shifted by the output of frequency generator 1416 through adder 1432. The output of adder 1432 is filtered through filter 1404, and is again shifted by the output of frequency generator 1420 through adder 1406. Frequency generator 1420 and frequency generator 1416 receive a stable 14 MHz reference signal from reference frequency generator 1418 which generates a stable reference signal, such as a 14 MHz reference signal. The output of adder 1406 is processed through filter 1408, and amplified through amplifier 1410.

In operation, radio frequency signals received from a suitable antenna are down-converted to a suitable number of intermediate frequency bands at a suitable center frequency. For example, up to four intermediate frequencies in the 914.5 MHz band may be used. The intermediate frequency bands are then filtered through a suitable bandpass filter, and down-converted again to another suitable center frequency, such as 245 MHz. A very stable reference signal is used to provide a suitable level of accuracy for the output signal.

Figure 15:
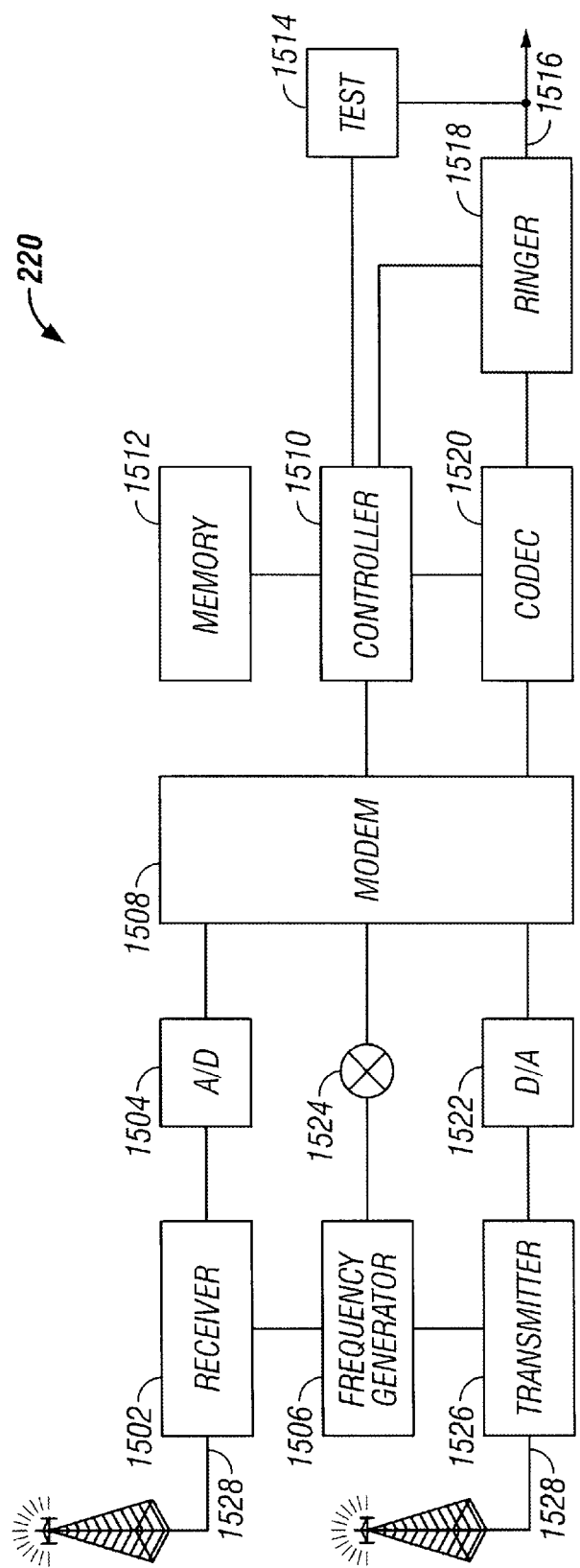
FIG. 15 is a block diagram of a subscriber terminal in accordance with an embodiment of the present invention.

FIG. 15 is a block diagram of a subscriber terminal 220 in accordance with an embodiment of the present invention. Subscriber terminal 220 includes antenna 1528. Antenna 1528 receives signals transmitted from radio frequency assembly 216, and transfers the signals to receiver 1502. Receiver 1502 may be implemented in software, hardware, or a suitable combination of software and hardware. The signal is processed by receiver 1502 and is then transmitted to analog to digital converter 1504, which outputs a digital signal to modem 1508. Analog to digital converter 1504 may be implemented in hardware, software, or a suitable combination of hardware and software.

Modem 1508 is a modulator/demodulator that converter the signal received from antenna 1528 to a telecommunications data signal. Modem 1508 may be implemented in hardware, software, or a suitable combination of hardware and software. The telecommunications data signal is then provided to controller 1510, which is configured to access memory 1512, test circuits 1514, and ringer 1518 in response to the telecommunications data. For example, encoded control signals may be received from the telecommunications data that are used to ring a telephone handset connected to the subscriber interface 1516. Ringer 1518 or other suitable elements may be used to generate the ringing signal. Controller 1510, memory 1512, test circuits 1514, and ringer 1518 may be implemented in hardware, software, or a suitable combination of hardware and software either individually, as a group, or in addition to other components.

Data input by the subscriber is transmitted through ringer circuit 1518 to coder/decoder 1520. Coder/decoder 1520 may be implemented in hardware, software, or a suitable combination of hardware and software. Coder/decoder 1520 converts data input from a subscriber into a format suitable for processing by a modulator/demodulator, and transfers the data to modem 1508.

Modem 1508 transfers the signal received from subscriber interface 1516 to digital to analog converter 1522 and transmitter 1526 for transmission over antenna 1528. Digital to analog converter 1522 and transmitter 1526 may be implemented in hardware, software, or a suitable combination of hardware and software. Modem 1508 is also coupled to crystal 1524, which is coupled to frequency generator 1506 and which provides a reference frequency for use by frequency generator 1506.

The subscriber terminal 220 is a full duplex modem that operates at a suitable radio transmission frequency, such as in the range from 1.5 to 2.0 Ghz. The subscriber terminal 220 is operable to tune to the radio transmission frequency in a suitable step size. A suitable intermediate frequency bandwidth is used to allow the subscriber terminal 220 to receive the modulated radio transmission signal, such as one that includes code division multiple access modulated signals. For example, the modulated signal may include 32 Rademacher Walsh code channels that include 28 channels for voice data and 4 channels of signaling and control overhead data.

The modulator/demodulator of the subscriber terminal 220 is operable to process a suitable number of channels, such as 8. For example, the modulator/demodulator may be a multi-carrier modulator application-specific integrated circuit. In addition to code division multiple access modulation and demodulation, the modulator/demodulator of the subscriber terminal 220 may also provide quadrature phase-shift keying modulation/demodulation, pulse code modulation/demodulation, and phase noise demodulation. The controller 1510 of the subscriber terminal 220 is operable to perform antenna diversity switching, carrier recovery, receiver code synchronization, transmitter diversity and synchronization, transmitter power control, and other suitable functions, in response to local signal measurements, such as the signal quality and the signalling and control data received.

Figure 16:
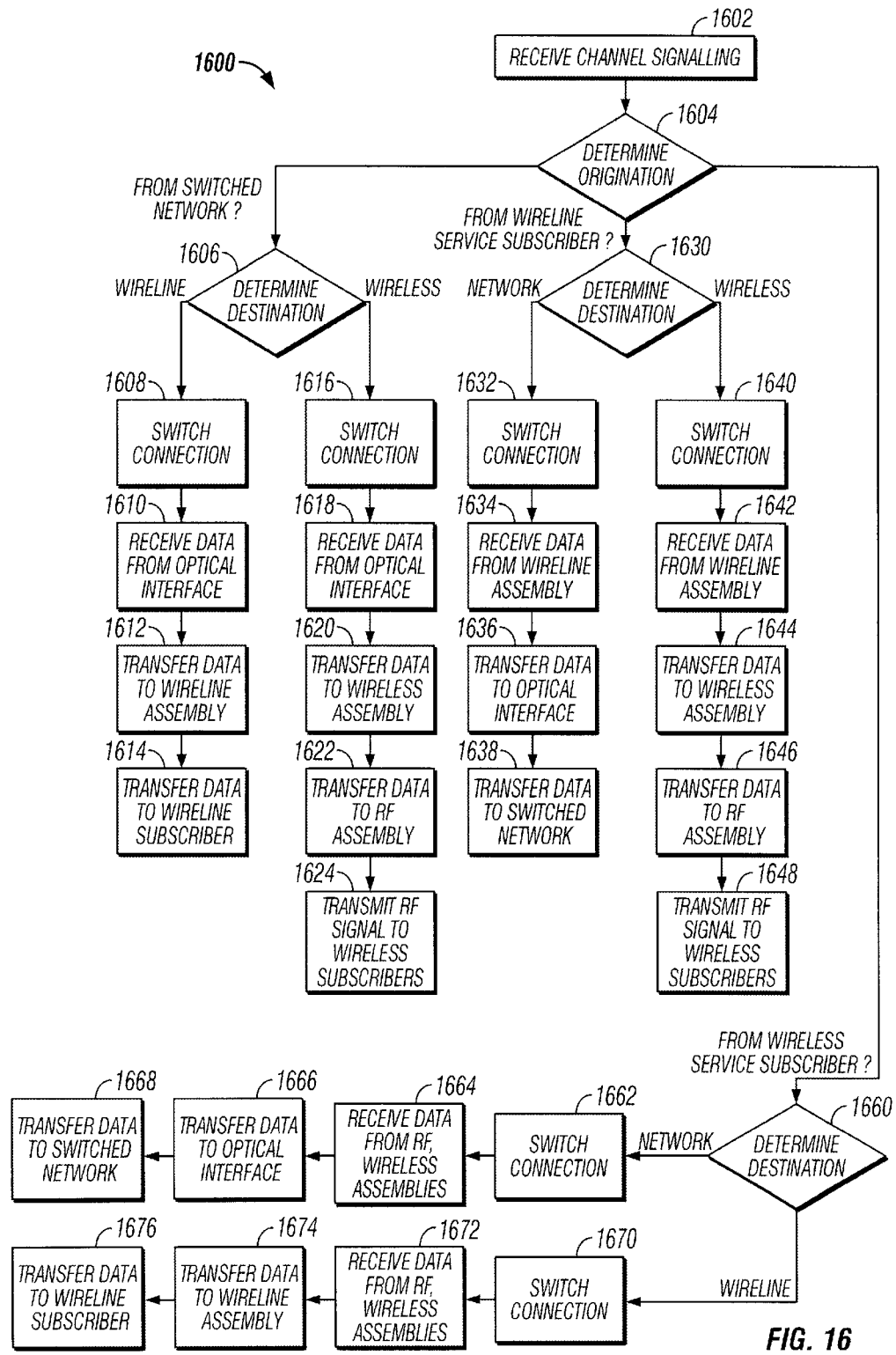
FIG. 16 is a flow chart of a method for providing telecommunications system access in accordance with the present invention.

FIG. 16 is a flow chart of a method 1600 for providing telecommunications access in accordance with an embodiment of the present invention. Method 1600 is used to provide wireless and wireline telecommunications access to a switched network in a single, coordinated system.

Method 1600 begins at step 1602, where telecommunications channel signaling is received at a suitable system of an access unit, such as a common control and switching system. The method then proceeds to step 1604, where further telecommunications data processing is determined as a function of where the call originated from.

If the call originated from a switched network, then the method proceeds to step 1606, where the call destination is determined. If the call destination is a wireline subscriber, the method proceeds to step 1608, where the telecommunications channel connection is established, such as by switching through a time division multiplex switch. The method then proceeds to step 1610, where telecommunications data is received from an optical interface. The telecommunications data may then be converted into a suitable format, such as an electrical signal in a SONET data format. At step 1612, the telecommunications data is transferred to a suitable system for transfer to a wireline subscriber, such as a wireline assembly. The method then proceeds to step 1614, where the telecommunications data is transferred to the wireline subscriber, such as by transmission over an electrical conductor or optical fiber.

If the call destination is determined to be a wireless subscriber at step 1606, the method proceeds to step 1616 where a telecommunications data channel is established, such as by switching through a time division multiplex switch. In addition, a telecommunications data channel may be established by transmitting signaling data to the wireless subscriber unit destination using a dedicated signaling data channel. After a telecommunications data channel is established, the method proceeds to step 1618, where telecommunications data is received from an optical interface to the switched network. The telecommunications data may then be converted into a suitable format, such as an electrical signal in a SONET data format. At step 1620, the telecommunications data is transferred to a suitable system for transfer to a wireless subscriber, such as a wireless assembly. The telecommunications data may also be modulated onto a suitable signal, including but not limited to code division multiple access modulation, multiple carrier modulation, quadrature phase-shift keying modulation, pulse code modulation, or other suitable types of modulation.

The method then proceeds to step 1622, where the telecommunications data is transferred to a radio transmitter, such as a radio frequency assembly. A signal carrying the encoded telecommunications data is then transmitted to the wireless subscribers at step 1624.

In addition to transferring telecommunications data to a wireline subscriber or a wireless subscriber from the switched network at step 1606, method 1600 may also be used to transfer telecommunications data from the switched network back to the switched network, if necessary. Such switching may be required under certain circumstances, and may be performed using a system such as access unit 100.

If the call originated from a wireline service subscriber, then the method proceeds to step 1630, where the call destination is determined. If the call destination is a network subscriber, the method proceeds to step 1632, where the telecommunications channel connection is established, such as by switching through a time division multiplex switch. The method then proceeds to step 1634, where telecommunications data is received from a suitable wireline subscriber access interface, such as a wireline assembly. The telecommunications data is then transferred to a suitable network transfer media at step 1636, such as an optical interface. In addition, the telecommunications data may also be converted into a suitable format, such as an optical signal in a SONET data format. At step 1638, the telecommunications data is transferred to the switched network by a suitable means, such as an optical fiber.

If the call destination is determined to be a wireless subscriber at step 1630, the method proceeds to step 1640 where a telecommunications data channel is established, such as by switching through a time division multiplex switch. In addition, a telecommunications data channel may be established by transmitting signaling data to the wireless subscriber unit destination using a dedicated signaling data channel. After a telecommunications data channel is established, the method proceeds to step 1642, where telecommunications data is received from a suitable interface to the wireline subscriber, such as a wireline assembly. At step 1644, the telecommunications data is transferred to a suitable system for transfer to a wireless subscriber, such as a wireless assembly. The telecommunications data may also be modulated onto a suitable signal, including but not limited to code division multiple access modulation, multiple carrier modulation, quadrature phase-shift keying modulation, pulse code modulation, or other suitable types of modulation.

The method then proceeds to step 1646, where the telecommunications data is transferred to a radio transmitter, such as a radio frequency assembly. A signal carrying the encoded telecommunications data is then transmitted to the wireless subscribers at step 1648.

In addition to transferring telecommunications data to a switched network or a wireless subscriber from the wireline service subscriber at step 1630, method 1600 may also be used to transfer telecommunications data from a wireline service subscriber to another wireline service subscriber, if necessary. Such switching may be required under certain circumstances, and may be performed using a system such as access unit 100.

If the call originated from a wireless service subscriber, then the method proceeds to step 1660, where the call destination is determined. If the call destination is a network subscriber, the method proceeds to step 1662, where the telecommunications channel connection is established, such as by switching through a time division multiplex switch. In addition, a telecommunications data channel may be established by transmitting signaling data to the wireless subscriber unit using a dedicated signaling data channel. The method then proceeds to step 1664, where telecommunications data is received from a suitable wireless subscriber access interface, such as a radio frequency assembly and a wireless assembly. In addition, the signal may be demodulated by a suitable demodulation process, including but not limited to code division multiple access modulation, multiple carrier modulation, quadrature phase-shift keying modulation, pulse code modulation, or other suitable types of modulation. The telecommunications data is then transferred to a suitable network transfer media at step 1666, such as an optical interface. In addition, the telecommunications data may also be converted into a suitable format, such as an optical signal in a SONET data format. At step 1668, the telecommunications data is transferred to the switched network by a suitable means, such as an optical fiber.

If the call destination is determined to be a wireline subscriber at step 1660, the method proceeds to step 1670 where a telecommunications data channel is established, such as by switching through a time division multiplex switch. In addition, a telecommunications data channel may be established by transmitting signaling data to the wireless subscriber unit using a dedicated signaling data channel. After a telecommunications data channel is established, the method proceeds to step 1672, where telecommunications data is received from a suitable interface to the wireless subscriber, such as a radio frequency assembly and a wireless assembly. In addition, the signal may be demodulated by a suitable demodulation process, including but not limited to code division multiple access modulation, multiple carrier modulation, quadrature phase-shift keying modulation, pulse code modulation, or other suitable types of modulation. The telecommunications data is then transferred to a suitable system for transfer to a wireline subscriber at step 1674, such as a wireline assembly. The method then proceeds to step 1676, where the telecommunications data is transferred to the wireline services subscriber.

In addition to transferring telecommunications data to a switched network or a wireline subscriber from the wireless service subscriber at step 1660, method 1600 may also be used to transfer telecommunications data from a wireless service subscriber to another wireless service subscriber, if necessary. Such switching may be required under certain circumstances, and may be performed using a system such as access unit 100.

In operation, the present invention provides wireless telecommunications system access to one or more subscriber terminals. Channels of telecommunications data are received at a wireless assembly that combines the channels into trunk groups, and which then combines the trunk groups into one or more signals for broadcast. The wireless assembly also receives one or more composite signals from the subscriber terminal(s), and separates the trunk groups of signals from the composite signal. The wireless assembly then separates the channels of telecommunications data from each trunk group, and the channels of telecommunications data are then transmitted to a switched network, other subscriber terminals, landline terminals, or other call parties.

The present invention is well adapted to carry out the objects and attain the ends and advantages mentioned, as well as others inherent therein. While an exemplary embodiment of the invention have been given for the purposes of disclosure, alternative embodiments, changes and modifications in the details of construction, interconnection and arrangement of parts will readily suggest themselves to those skilled in the art after having the benefit of this disclosure.

In particular, connections between systems, components, and elements are not limited to the specific modes discussed herein, but are intended to include any suitable form of connection, including but not limited to electrical connectors, optical connectors, and logical connectors. Where not explicitly otherwise limited, singular elements, components, and features may be replaced with plural elements, components, and features and plural elements, components, and features may be replaced with singular elements, components, and features. This invention is not necessarily limited to the specific embodiment and examples illustrated and described above. All embodiments, changes and modifications encompassed within the spirit of the invention are included, and the scope of the invention is defined by a proper construction of the following claims.

What is claimed is:

1. A system for providing telecommunications access comprising:

a wireline assembly operable to provide access to a telecommunications system for one or more wireline subscribers;

a wireless assembly operable to process an encoded signal carrying one or more trunk groups of channels of telecommunications data;

a common control and switching system coupled to the wireline assembly, the wireless assembly, and a switched network, the common control and switching assembly operable to establish and control telecommunications channels between the wireline assembly, the wireless assembly, and the switched network; and the common control and switching assembly includes;

a data bus configured to carry one or more channels of telecommunications data;

a timing control processor operable to control the transfer of data over the data bus so as to regulate the timing of the data transferred over the data bus;

one or more switches coupled to the data bus, the wireless assembly, and the wireline assembly, each switch operable to transfer channels of telecommunications data to the wireline assembly and the wireless assembly from the data bus; and a timing control unit coupled to the data bus, the wireline assembly, and the wireless assembly, the timing control unit operable to transmit a timing signal to tie wireline assembly and the wireless assembly for use in receiving the channels of telecommunications data from the switch(es).

2. The system of claim 1 further comprising one or more subscriber units, where each subscriber unit is coupled to the wireless assembly using radio frequency electromagnetic radiation.

3. The system of claim 1 further comprising an optical interface coupled to the common control and switching assembly and the switched network, where the optical interface converts optical signals carrying encoded telecommunications channels into electrical signals for use by the common control and switching assembly, and further converts electrical signals from the common control and switching assembly into optical signals for transmission to the switched network over an optical fiber.

4. The system of claim 1 wherein the switch(es) are time slot switches.

5. The system of claim 1 further comprising a radio frequency assembly coupled to the wireless assembly and an antenna, where the radio frequency assembly is operable to up-convert an outgoing modulated signal received from the wireless assembly from a signal processing frequency to a transmission frequency for transmission over the antenna, and to down-convert an incoming modulated signal received from the antenna from the transmission frequency to the signal processing frequency.

6. The system of claim 5 wherein the radio frequency assembly further comprises one or more up-converters coupled to the wireless assembly and the antenna.

7. The system of claim 5 wherein the radio frequency assembly further comprises one or more down-converters coupled to the wireless assembly and the antenna.

8. The system of claim 5 wherein the radio frequency assembly further comprises a radio frequency controller operable to provide a frequency reference signal to components of the radio frequency assembly and to store provisioning data for components of the radio frequency assembly.

9. A system for providing telecommunications access comprising:
   a wireline assembly operable to provide access to a telecommunications system for one or more wireline subscribers;
   a wireless assembly operable to process an encoded signal carrying one or more trunk groups of channels of telecommunications data;
   a common control and switching system coupled to the wireline assembly, the wireless assembly, and a switched network, the common control and switching assembly operable to establish and control telecommunications channels between the wireline assembly, the wireless assembly, and the switched network; and
   a radio frequency assembly coupled to the wireless assembly and an antenna, where the radio frequency assembly is operable to unconvert an outgoing modulated signal received from the wireless assembly from a signal processing frequency to a transmission frequency for transmission over the antenna, and to down-convert an incoming modulated signal received from the antenna from the transmission frequency to the signal processing frequency.

10. The system of claim 9 further comprising one or more subscriber units, where each subscriber unit is coupled to the wireless assembly using radio frequency electromagnetic radiation.

11. The system of claim 9 further comprising an optical interface coupled to the common control and switching assembly and the switched network, where the optical interface converts optical signals carrying encoded telecommunications channels into electrical signals for use by the common control and switching assembly, and further converts electrical signals from the common control and switching assembly into optical signals for transmission to the switched network over an optical fiber.

12. The system of claim 9 wherein the switch(es) are time slot switches.

13. The system of claim 9 wherein the radio frequency assembly further comprises one or more up-converters coupled to the wireless assembly and the antenna.

14. The system of claim 9 wherein the radio frequency assembly further comprises one or more down-converters coupled to the wireless assembly and the antenna.

15. The system of claim 9 wherein the radio frequency assembly further comprises a radio frequency controller operable to provide a frequency reference signal to components of the radio frequency assembly and to store provisioning data for components of the radio frequency assembly.

* * * * *